(12) United States Patent
Kajino et al.

(10) Patent No.: US 12,456,044 B2
(45) Date of Patent: Oct. 28, 2025

(54) LEARNING APPARATUS AND METHOD FOR BIDIRECTIONAL LEARNING OF PREDICTIVE MODEL BASED ON DATA SEQUENCE

(71) Applicant: INTERNATIONAL BUSINESS MACHINES CORPORATION, Armonk, NY (US)

(72) Inventors: Hiroshi Kajino, Tokyo (JP); Takayuki Osogami, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 784 days.

(21) Appl. No.: 15/804,702

(22) Filed: Nov. 6, 2017

(65) Prior Publication Data

US 2018/0197082 A1 Jul. 12, 2018

Related U.S. Application Data

(63) Continuation of application No. 15/403,986, filed on Jan. 11, 2017, now abandoned.

(51) Int. Cl.
G06N 3/08 (2023.01)
G06N 3/047 (2023.01)
G06N 7/01 (2023.01)

(52) U.S. Cl.
CPC .............. *G06N 3/08* (2013.01); *G06N 3/047* (2023.01); *G06N 7/01* (2023.01)

(58) Field of Classification Search
CPC .......... G06N 3/08; G06N 3/084; G06N 20/00; G06N 3/0445; G06N 5/02; G06N 5/022;
(Continued)

(56) References Cited

U.S. PATENT DOCUMENTS

2011/0066579 A1* 3/2011 Ikada ................... G06N 3/02
706/21
2013/0282634 A1 10/2013 Deng et al.
(Continued)

FOREIGN PATENT DOCUMENTS

CN 106127806 A 11/2016
JP 2011059815 3/2011

OTHER PUBLICATIONS

Niedzwiecki et al., "Elimination of Impulsive Disturbances From Archive Audio Signals Using Bidirectional Processing," IEEE Transactions on Audio, Speech, and Language Processing, vol. 21, No. 5, May 2013 (Year: 2013).*

(Continued)

*Primary Examiner* — Leonard A Sieger
(74) *Attorney, Agent, or Firm* — Tutunjian & Bitetto, P.C.; Robert Richard Aragona

(57) ABSTRACT

A computer-implemented method and an apparatus are provided for learning a first model. The method includes generating a second model based on the first model. The first model is configured to perform a learning process based on sequentially inputting each of a plurality of pieces of input data that include a plurality of input values and that are from a first input data sequence. The second model is configured to learn a first learning target parameter included in the first model based on inputting, in an order differing from an order in the first model, each of a plurality of pieces of input data that include a plurality of input values and are from a second input data sequence. The method further includes performing a learning process using both the first model and the second model. The method also includes storing the first model that has been learned.

20 Claims, 12 Drawing Sheets

(58) Field of Classification Search
CPC ........ G06N 3/0472; G06N 3/047; G06N 7/01; Y04S 10/54
See application file for complete search history.

(56) References Cited

U.S. PATENT DOCUMENTS

| | | | |
|---|---|---|---|
| 2015/0178638 A1 | 6/2015 | Deshpande et al. | |
| 2016/0071024 A1* | 3/2016 | Amer | G06N 20/00 706/12 |
| 2016/0092767 A1 | 3/2016 | Osogami et al. | |
| 2016/0098631 A1 | 4/2016 | Osogami et al. | |
| 2017/0140259 A1* | 5/2017 | Bergstra | G06N 3/04 |
| 2017/0140298 A1* | 5/2017 | Wabnig | G06N 3/0445 |

OTHER PUBLICATIONS

Wakuya et al., "Time Series Prediction with a Neural Network Model Based on Bidirectional Computation Style: An Analytical Study and Its Estimation on Acquired Signal Transformation," Electrical Engineering in Japan, vol. 145, No. 3, 2003 (Year: 2003).*

Hu, Xiao et al., "Time series prediction with a weighted bidirectional multi-stream extended Kalman filter," Neurocomputing 70 (2007), pp. 2392-2399 (Year: 2007).*

Triefenbach et al., "Acoustic Modeling With Hierarchical Reservoirs," IEEE Transactions on Audio, Speech, and Language Processing, vol. 21, No. 11, Nov. 2013 (Year: 2013).*

Somkid Amornsamanjul and Pawalai Kraipeerapun, "Bagging of Duo Output Neural Networks for Single Output Regression Problem," IEEE 918-1-4244-5540-9/10 2010 (Year: 2010).*

Brocki et al., "Deep Belief Neural Networks and Bidirectional Long-Short Term Memory Hybrid for Speech Recognition", 2015, Archives of Acoustics, vol. 40 No. 2, pp. 191-195 (Year: 2018).*

Cheng et al., "Fblg: A simple and effective approach for temporal dependence discovery from time series data", 2014, In Proc Knowledge Discovery and Data Mining, vol. 2014, pp. 382-391 (Year: 2014).*

Nakashika et al., "Modeling deep bidirectional relationships for image classification and generation", 2016, IEEE International Conference on Acoustics, Speech and Signal Processing (ICASSP), vol. 2016, pp. 1327-1331 (Year: 2016).*

Hrasko et al., "Time Series Prediction using Restricted Boltzmann Machines and Backpropagation", 2015, Procedia Computer Science, vol. 55 (2015), pp. 990-999 (Year: 2015).*

Smith, "Grammar Inference Using Recurrent Neural Networks", 2003, University of California, pp. 1-11 (Year: 2003).*

Whiteway et al., "Revealing unobserved factors underlying cortical activity using a rectified latent variable model applied to neural population recordings", 2016, Journal of Neurophysiology, vol. 2016, pp. 1-40 (Year: 2016).*

Osogami et al., "Learning dynamic Boltzmann machines with spike-timing dependent plasticity", 2015, arXiv, v1509.08634v1, pp. 1-14 (Year: 2015).*

Osogami et al., "Seven neurons memorizing sequences of alphabetical images via spike-timing dependent plasticity", 2015, Scientific Reports, vol. 5, art 14149, pp. 1-13 (Year: 2015).*

Schuster et al., "Bidirectional Recurrent Neural Networks", 1997, IEEE Transactions on Signal Processing, vol. 45 No. 11, pp. 2673-2681 (Year: 1997).*

Vukotic et al., "Multimodal and Crossmodal Representation Learning from Textual and Visual Features with Bidirectional Deep Neural Networks for Video Hyperlinking", 2016, iV&L-MM'16, vol. 2016, pp. 37-44 (Year: 2016).*

Feng et al., "Optimize real-valued RBM with Bidirectional Autoencoder", 2015, International Conference on Fuzzy Theory and Its Applications (iFUZZY), vol. 2015, pp. 22-27 (Year: 2015).*

Le, Quoc, "A Tutorial on Deep Learning Part 1: Nonlinear Classifiers and The Backpropagation Algorithm", 2015, Google (Year: 2015).*

International Search Report issued in PCT/IB2017/057999 dated Apr. 27, 2017, 10 pages.

List of IBM Patents or Patent Applications Treated as Related dated Nov. 6, 2017, 2 pages.

Hinton, et al., "Spiking Boltzmann Machines", Gatsby Computational Neuroscience Unit; University College London, May 2007, pp. 122-128.

Kim, et al., "Spacecraft Attitude Control Using Neuro-Fuzzy Approximation of The Optimal Controllers", ScienceDirect, Advances in Space Research, Sep. 2015, 16 pages.

Osogami, et al., "Learning Dynamic Boltzmann Machines With Spike-Timing Dependent Plasticity", arXiv, Sep. 2015, pp. 2-14.

Osogami, et al., "Seven Neurons Memorizing Sequences of Alphabetical Images Via Spike-Timing Dependent Plasticity", Scientific Reports, Sep. 2015, pp. 1-13.

Osogami, Takayuki, "Mimicking Neurons with Math" IBM Research Blog, Sep. 2015, pp. 1-3.

Roudi, et al., "Learning with Hidden Variables", ScienceDirect, Current Opinion in Neurobiology, Aug. 2015, pp. 110-118.

Schuster, et al., "Bidirectional Recurrent Neural Networks", IEEE Transactions on Signal Processing, Nov. 1997, vol. 45, No. 11, pp. 2673-2681.

Sutskever, et al., "The Recurrent Temporal Restricted Boltzmann Machine", Neural Information Processing Systems, Dec. 2008, 8 pages.

Sutskever, et al., "Learning Multilevel Distributed Representations for High-Dimensional Sequences", Journal of Machine Learning Research 2, Jan. 2007, 8 pages.

Wakuya, Hiroshi, et al. "Time Series Prediction by a Neural Network Model Based on the Bi-Directional Computation Style", InProceedings of the IEEE-INNS-ENNS International Joint Conference on Neural Networks. JCNN 2000. Neural Computing: New Challenges and Perspectives for the New Millennium, IEEE, vol. 2. Jul. 27, 2000, pp. 225-230.

Japanese Office Action issued in JP Application No. 2019-535257, dated Jun. 30, 2021, pp. 1-3.

* cited by examiner

LEARNING APPARATUS AND METHOD FOR BIDIRECTIONAL LEARNING OF PREDICTIVE MODEL BASED ON DATA SEQUENCE

BACKGROUND

Technical Field

The present invention generally relates to predictive models, and more particularly to a learning apparatus and method for bidirectional learning of a predictive model based on a data sequence.

Description of Related Art

Conventionally, a neural network, Boltzmann machine, and the like are known that can be applied to time-series data. Furthermore, a dynamic Boltzmann machine is known that can learn a model corresponding to data input in time series through machine learning.

Such a Boltzmann machine or the like is desired to have improved expressive power, learning power, and the like by accurately learning a predictive model based on a data sequence, in order to be applied to various fields such as moving images, languages, signal waveforms, and music.

SUMMARY

According to an aspect of the present invention, a computer-implemented method is provided for learning a first model. The method includes generating, by a processor, a second model based on the first model. The first model is configured to perform a learning process based on sequentially inputting each of a plurality of pieces of input data that include a plurality of input values and that are from a first input data sequence. The second model is configured to learn a first learning target parameter included in the first model based on inputting, in an order differing from an order in the first model, each of a plurality of pieces of input data that include a plurality of input values and are from a second input data sequence. The method further includes performing, by the processor, a learning process using both the first model and the second model. The method also includes storing, in a memory device, the first model that has been learned.

According to another aspect of the present invention, a computer program product is provided for predictive model learning. The computer program product includes a non-transitory computer readable storage medium having program instructions embodied therewith. The program instructions are executable by a computer to cause the computer to perform a method. The method includes generating, by a processor, a second model based on a first model. The first model is configured to perform a learning process based on sequentially inputting each of a plurality of pieces of input data that include a plurality of input values and are from a first input data sequence. The second model is configured to learn a first learning target parameter included in the first model based on inputting, in an order differing from an order in the first model, each of a plurality of pieces of input data that include a plurality of input values and are from a second input data sequence. The method further includes performing, by the processor, a learning process using both the first model and the second model. The method also includes storing, in a memory device, the first model that has been learned.

According to yet another aspect of the present invention, a learning apparatus is provided for learning a model corresponding to input data. The learning apparatus includes a processor. The learning apparatus further includes one or more computer readable mediums collectively including instructions that, when executed by the processor, cause the processor to generate a second model based on a first model. The first model is configured to perform a learning process based on sequentially inputting each of a plurality of pieces of input data that include a plurality of input values and are from a first input data sequence. The second model is configured to learn a first learning target parameter included in the first model based on inputting, in an order differing from an order in the first model, each of a plurality of pieces of input data that include a plurality of input values and are from a second input data sequence. The one or more computer readable mediums collectively including instructions that, when executed by the processor, further cause the processor to perform a learning process using both the first model and the second model. The one or more computer readable mediums collectively including instructions that, when executed by the processor, further cause the processor to store the first model that has been learned.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
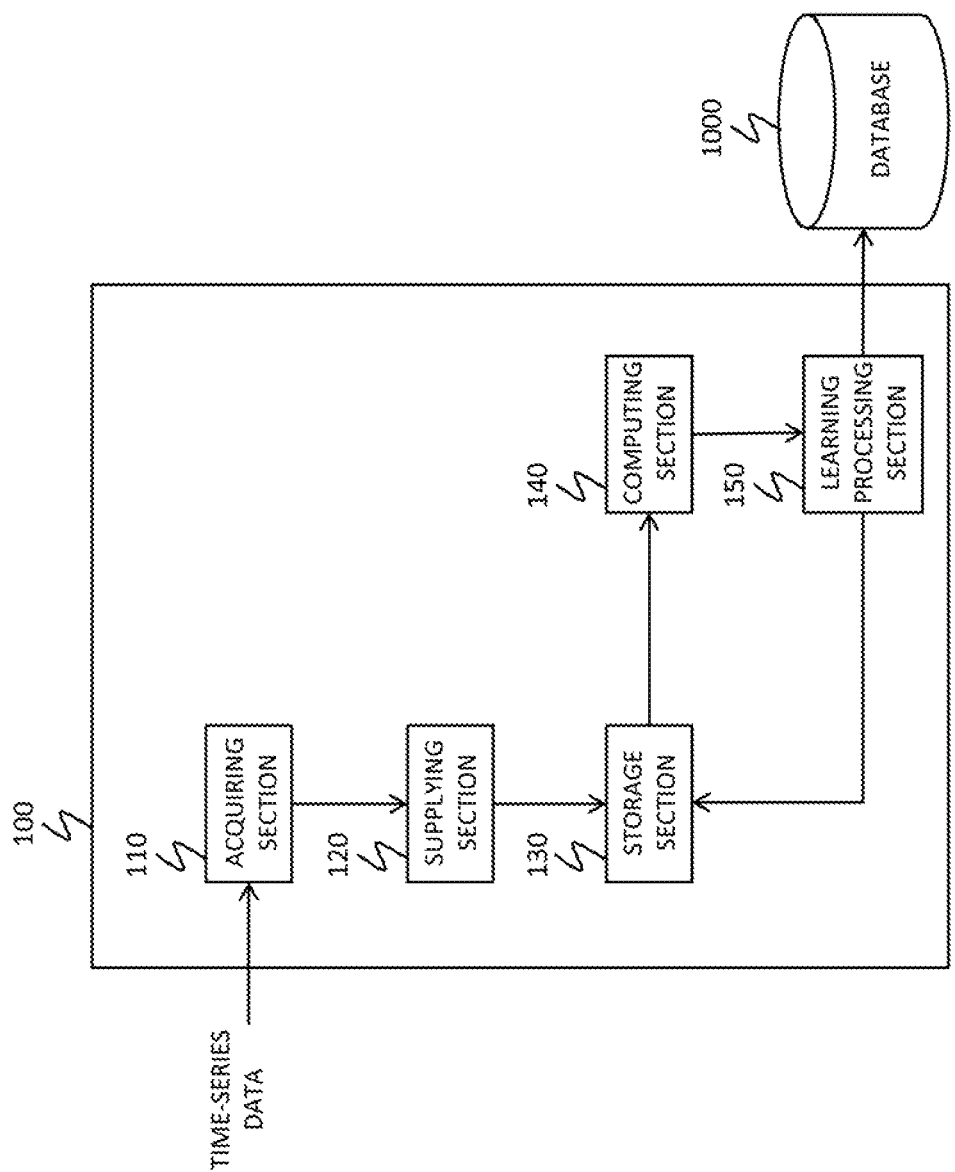
FIG. 1 shows an exemplary configuration of a learning apparatus 100, according to an embodiment of the present invention.

FIG. 1 shows an exemplary configuration of a learning apparatus 100 according to an embodiment. The learning apparatus 100 may be an apparatus for learning a model 10 corresponding to time-series input data. The learning apparatus 100 may be operable to learn a model based on a Boltzmann machine by supplying time-series data to nodes of the model. The learning apparatus 100 includes an acquiring section 110, a supplying section 120, a storage section 130, a computing section 140, and a learning processing section 150.

The acquiring section 110 may be operable to acquire time-series input data. Time-series input data may be, for example, a data sequence in which a plurality of pieces of data are arranged along a time axis, such as moving image data. The acquiring section 110 may be connected to a device operated by a user or a device (sensor) that detects and outputs time-series data and may acquire the time-series input data from such a device. Alternatively, the acquiring section 110 may read and acquire time-series input data stored in a storage device in a predetermined format. Alternatively, the acquiring section 110 may be connected to a network and acquire time-series input data via the network. The acquiring section 110 may also store the acquired time-series input data in a storage device included in the learning apparatus 100.

The supplying section 120 may be operable to supply a plurality of input values corresponding to input data at one time point in the time-series input data to a plurality of nodes of a model. The supplying section 120 is connected to the acquiring section 110 and may handle, as training data, input data at one time point in the received time-series input data and supply input values at the one time point to corresponding nodes of the model. Input data at one time point may be the temporally newest data in a training data set for use in learning. Alternatively, input data at one time point may be temporally intermediate data in a training data set for use in learning. That is, input data at one time point may be selected arbitrarily from the time-series data.

The storage section 130 may be operable to store values of hidden nodes of the model in correspondence with a plurality of time points in the time-series input data. The storage section 130 may sample the values of hidden nodes corresponding to one time point and store these values in the hidden nodes corresponding to this time point. The storage section 130 may store the sampled values respectively in the hidden nodes corresponding to the time points for each time point.

The computing section 140 may be operational to compute a conditional probability of each input value at one time point on a condition that an input data sequence has occurred. Here, in the time-series input data, the pieces of data input to the respective nodes of the model at one time point are referred to as input values at one time point, and the pieces of data input to the respective nodes at the time points before the one time point are referred to as the input data sequence. A model used by the learning apparatus 100 may have a weight parameter between (i) a plurality of hidden nodes and a plurality of input values corresponding to input data at each time point prior to the one time point in an input data sequence and (ii) a plurality of hidden nodes corresponding to the one time point and a plurality of input nodes.

The computing section 140 may be operable to compute a conditional probability of each input value at one time point, on the basis of an input data sequence before the one time point in the time-series input data, the stored values of hidden nodes, and the weight parameter of the model. Furthermore, the computing section 140 may be operable to compute a conditional probability of the value of each hidden node at one time point on a condition that an input data sequences has occurred, based on an input data sequence before the one time point in the time-series input data and the weight parameter of the model.

The learning processing section 150 may be operable to increase a conditional probability of input data at one time point occurring on a condition that the input data sequence has occurred, by adjusting the weight parameter of the model. The learning processing section 150 may further adjust bias parameters which are given respectively to the plurality of nodes and hidden nodes of the model. The learning processing section 150 may supply the adjusted weight parameter and bias parameters of the model to a storage device, such as an external database 1000, to store these parameters in the storage device.

The above-described learning apparatus 100 according to the present embodiment may be operable to learn the model by adjusting the weight parameter and bias parameters of the model, based on input data at one time point in the time-series input data. The model according to the present embodiment is described with reference to FIG. 2.

Figure 2:
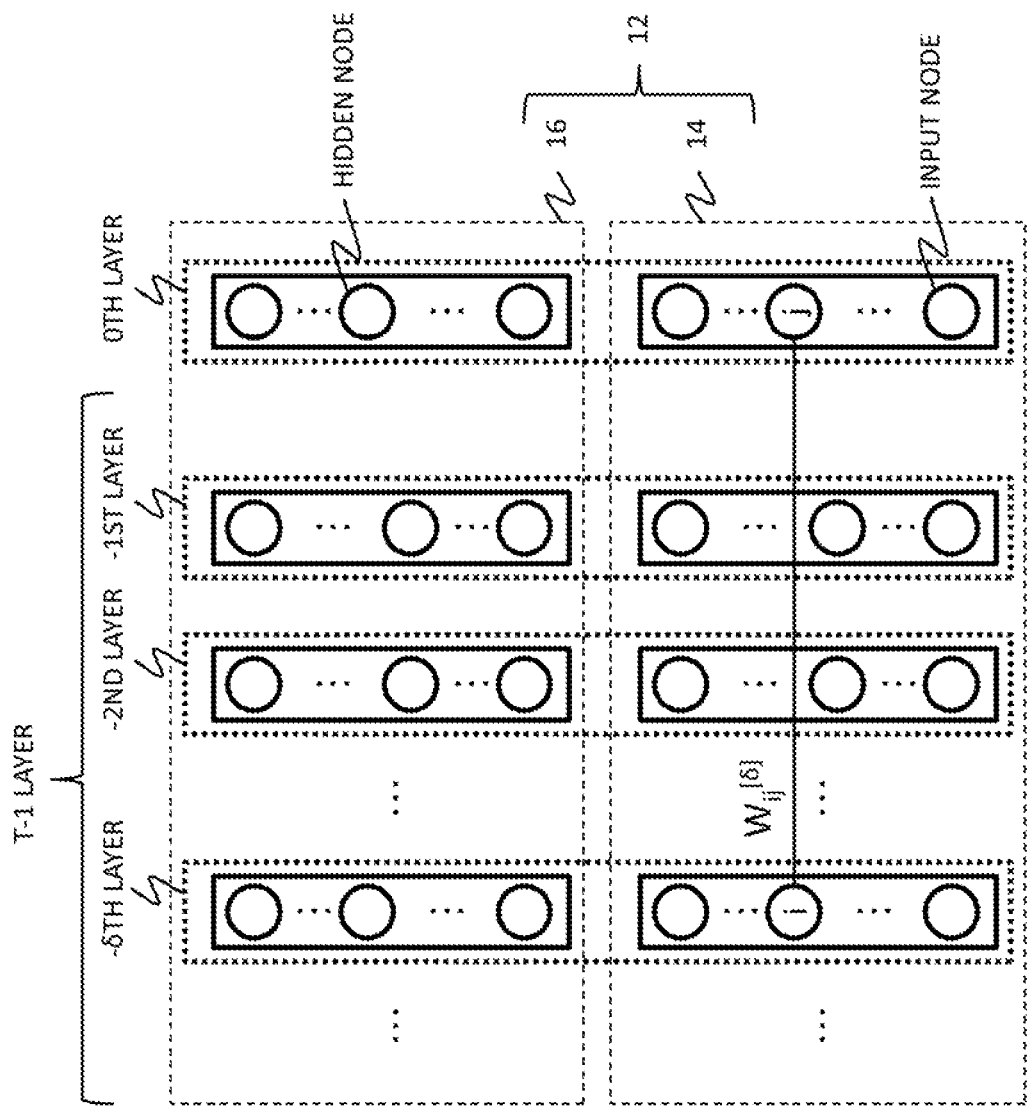
FIG. 2 shows an exemplary configuration of a model 10, according to an embodiment of the present invention.

FIG. 2 shows an exemplary configuration of a model 10 according to the present embodiment. The model 10 includes a plurality of common layers 12. FIG. 2 shows an example including a total of T common layers 12. The model 10 may include a finite number of common layers 12. Each common layer 12 includes an input layer 14 and a hidden layer 16.

Each input layer 14 may be a layer corresponding to the time-series data. Each input layer 14 may correspond to a respective time point in the time-series data. Each input layer 14 may include a predetermined number of nodes. For example, the 0-th input layer may be a layer corresponding to input data at one time point in the time-series data. The 0-th input layer may include a plurality of nodes corresponding to the number of input values in this input data.

A total of T−1 input layers 14 other than the 0-th input layer 14 among the plurality of input layers may be input layers 14 corresponding to the input data sequence before the one time point in the time-series input data. For example, the −1st input layer may correspond to input data at a time point that temporally precedes the one time point by one time point, and the (−δ)-th input layer may correspond to input data at a time point that temporally precedes the one time point by δ time points. That is, a total of T−1 input layers other than the 0-th input layer each have the same number of nodes as the 0-th input layer and are respectively supplied with input values of corresponding input data values in the input data sequence, for example.

Each hidden layer 16 may correspond to a respective time point in the time-series data. For example, the 0-th hidden layer may be a layer corresponding to one time point in the time-series data. FIG. 2 shows an example including a total of T hidden layers 16. Each hidden layer 16 may include one or more hidden nodes, and the storage section 130 may store the values sampled at the one time point.

A total of T−1 hidden layers other than the 0-th hidden layer among the plurality of hidden layers 16 may be hidden layers 16 corresponding to time points before the one time point in the time-series data. For example, the −1st hidden layer corresponds to a time point that temporally precedes the input data of the one time point by one time point, and the storage section 130 stores the values sampled at the time point that temporally precedes the one time point by one time point. Furthermore, the (−δ)-th hidden layer may correspond to a time point that temporally precedes the input data of the one time point by δ time points, and the storage section 130 may store the values sampled at the time point that temporally precedes the one time point by δ time points. That is, a total of T−1 hidden layers other than the 0-th hidden layer each have the same number of nodes as the 0-th hidden layer and are respectively supplied with values of corresponding hidden nodes, for example.

As an example, in the case where the time-series input data is moving image data, the last image data of the moving image data corresponds to the 0-th input layer, and a plurality of nodes of the 0-th input layer each receive corresponding pixel data of the image data. Furthermore, the 0-th hidden layer corresponds to the final time point of the moving image data, and the storage section 130 may store values sampled at this final time point in the hidden nodes of the 0-th hidden layer.

In addition, the −1st input layer is supplied with image data that immediately precedes the last image data, and a plurality of nodes of the −1st input layer each receive corresponding pixel data of the immediately preceding image data. Furthermore, the −1st hidden layer corresponds to the time point that immediately precedes the final time point, and for each of the plurality of nodes of the −1st hidden layer, the storage section 130 may store the values sampled at this immediately preceding time point. Similarly, the plurality of nodes of the (−δ)-th input layer each receive corresponding pixel data of image data that precedes the last image data by δ images, and the plurality of nodes of the (−δ)-th hidden layer each store corresponding sampling values at the time point that precedes the last time point by δ time points.

FIG. 2 shows an example in which each common layer 12 includes an input layer 14 and a hidden layer 16, but instead, one or more common layers 12 need not include a hidden layer 16. In such a case, the 0-th common layer to the (−m)-th common layer include input layers 14 and hidden layers 16, and the (−m−1)-th common layer to (−T+1)-th common layer may include input layers 14.

The plurality of nodes in the 0-th input layer and/or the plurality of hidden nodes in the 0-th hidden layer may each have a bias parameter. For example, the j-th node j in the common layer 12 has a bias parameter $b_j$.

The plurality of nodes in the 0-th input layer and the nodes of the hidden layer corresponding to the input data sequence and layers corresponding to the input data sequence before the one time point may respectively have weight parameters there between. There need not be weight parameters between the plurality of nodes in each input layer 14 and hidden layer 16.

Similarly, the plurality of nodes in the 0-th hidden layer and the nodes of the hidden layer corresponding to the input data sequence and layers corresponding to the input data sequence before the one time point may respectively have weight parameters there between. That is, the plurality of nodes of the 0-th common layer and the nodes of the plurality of common layers before the one time point may respectively have weight parameters there between.

FIG. 2 shows a concept of a weight parameter $W_{ij}^{[\delta]}$ between the node j of the 0-th input layer and a node i of the (−δ)-th layer. FIG. 2 shows an example in which the model 10 has the same number of input layers 14 and layers 16, each input layer 14 includes I nodes, and each hidden layer 16 includes H hidden nodes. In the present embodiment, the input layers 14 and hidden layers 16 are expressed by one common layer 12 that has a plurality of nodes $x_j^{[t]}$. The first to I-th nodes (1≤j≤I) of the common layer 12 indicate the nodes of the input layer 14, and the (I+1)-th to (I+H)-th nodes (I+1, j, I+H) indicate hidden nodes.

For example, the weight parameter $W_{ij}^{[\delta]}$ shown in FIG. 2 indicates a weight parameter between two nodes of an input layer 14. Similarly, the weight parameter $W_{ij}^{[\delta]}$ may include weight parameters from an input node to a hidden node, from a hidden node to an input node, and between to hidden nodes. A specific example of a weight parameter $W_{ij}^{[\delta]}$ is as shown in the Expression below. In the present embodiment, a weight parameter from an input node or hidden node to an input node is referred to as a "weight parameter to an input node," and a weight parameter from an input node or hidden node to a hidden node is referred to as a 'weight parameter to a hidden node."

$$W_{ij}^{[\delta]} = \hat{W}_{ij}^{[\delta]} + \hat{W}_{ij}^{[-\delta]} \qquad \text{Expression 1}$$

$$\hat{W}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_k^{-\delta} & \text{otherwise} \end{cases}$$

Here, $u_{i,j,k}$ and $v_{i,j,l}$ are learning parameters that are learning targets, for example. Furthermore, $\lambda_k^{t1}$ and $\lambda_k^{t2}$ are predefined parameters that change in a predetermined manner in accordance with a time point difference δ between the hidden nodes and input data in the input data sequence before the one time point and the hidden nodes and input data at the one time point (t1=δ−$d_{ij}$, t2=−δ). That is, the weight parameter $W_{ij}^{[\delta]}$ may be a parameter based on the learning parameters $u_{i,j,k}$ and $v_{i,j,l}$ the predefined parameters $\lambda_k^{t1}$ and $\mu_l^{t2}$.

The weight parameter $W_{ij}^{[\delta]}$ may be a parameter based on a positive value, which is based on a product of the first learning parameter $u_{i,j,k}$ and the first predefined parameter $\lambda_k^{t1}$, and a negative value, which is based on a product of the second learning parameter $v_{i,j,l}$ and a second predefined parameter $\mu_l^{t2}$. Specifically, in the case where the time point difference δ is greater than or equal to a predetermined delay constant $d_{ij}$, the weight parameter $W_{ij}^{[\delta]}$ may be a positive value based on a product of the first learning parameter $u_{i,j,k}$ and the first predefined parameter $\lambda_k^{t}1$. In the case where the time point difference δ is less than the delay constant $d_{ij}$ and is not equal to 0, the weight parameter $W_{ij}^{[\delta]}$ may be a negative value based on a product of the second learning parameter $v_{i,j,l}$ and the second predefined parameter $\mu_l^{t}2$. In addition, in the case where the time point difference δ is equal to 0, the weight parameter $W_{ij}^{[\delta]}$ may be equal to 0.

In addition, in the case where the time point difference δ is greater than or equal to the predetermined delay constant $d_{ij}$, the weight parameter $W_{ij}^{[\delta]}$ may be based on a plurality of positive values that are based on the products $u_{i,j,k} \cdot \lambda_k^{t}1$ of a plurality of sets of the first learning parameter $u_{i, j, k}$ and the first predefined parameter $\lambda_k^t 1$ respectively from among the plurality of first learning parameters $u_{i, j, k}$ and the plurality of first predefined parameters $\lambda_k^t 1$. In addition, in the case where the time point difference $\delta$ is less than the predetermined delay constant $d_{ij}$ and is not equal to 0, the weight parameter $W_{ij}^{[\delta]}$ may be based on a plurality of negative values that are based on products $v_{i, j, l} \mu_l^{t2}$ of a plurality of sets of the second learning parameter $v_{i, j, l}$ and the second predefined parameter $\mu_l^{t2}$ respectively from among the plurality of second learning parameters $v_{i, j, l}$ and the plurality of second predefined parameters $\mu_l^{t2}$.

A predefined parameter may be a parameter based on a value obtained by raising a predetermined constant to the power of a value based on the time point difference $\delta$. The first predefined parameter $\lambda_k^t 1$ is a parameter whose value gradually decreases as the time point difference $\delta$ increases, for example. In this case, the first predefined parameter $\lambda_k^t 1$ may be a value obtained by raising a first constant $\lambda_k$, which is greater than 0 and less than 1, to the power of a value obtained by subtracting the predetermined delay constant $d_{ij}$ from the time point difference $\delta$ ($\delta - d_{ij} = t1$). In addition, the second predefined parameter $\mu_l^{t2}$ may be a parameter whose value gradually decreases as the time point difference $\delta$ increases, for example. In this case, the second predefined parameter $\mu_l^t 2$ may be a value obtained by raising a second constant $\mu_l$, which is greater than 0 and less than 1, to the power of a negative value of the time point difference $\delta$ ($-\delta = t2$).

The above-described model 10 according to the present embodiment may be operable to form a Boltzmann machine. That is, the model 10 may be a Boltzmann machine to which time-series data is applied. The model 10 may be a Boltzmann machine that includes hidden layers into which are input values differing from the time-series data, in addition to the input layers into which the time-series data is input. The learning apparatus 100 according to the embodiment learns the model 10 by adjusting the learning parameters $u_{j, k}$ and $v_{j, l}$ and the bias parameter $b_j$ while sampling and storing the values of the hidden nodes, by using, as training data, input data at one time point that is supplied to the 0-th input layer of the model 10. A learning operation of the learning apparatus 100 is described with reference to FIG. 3.

Figure 3:
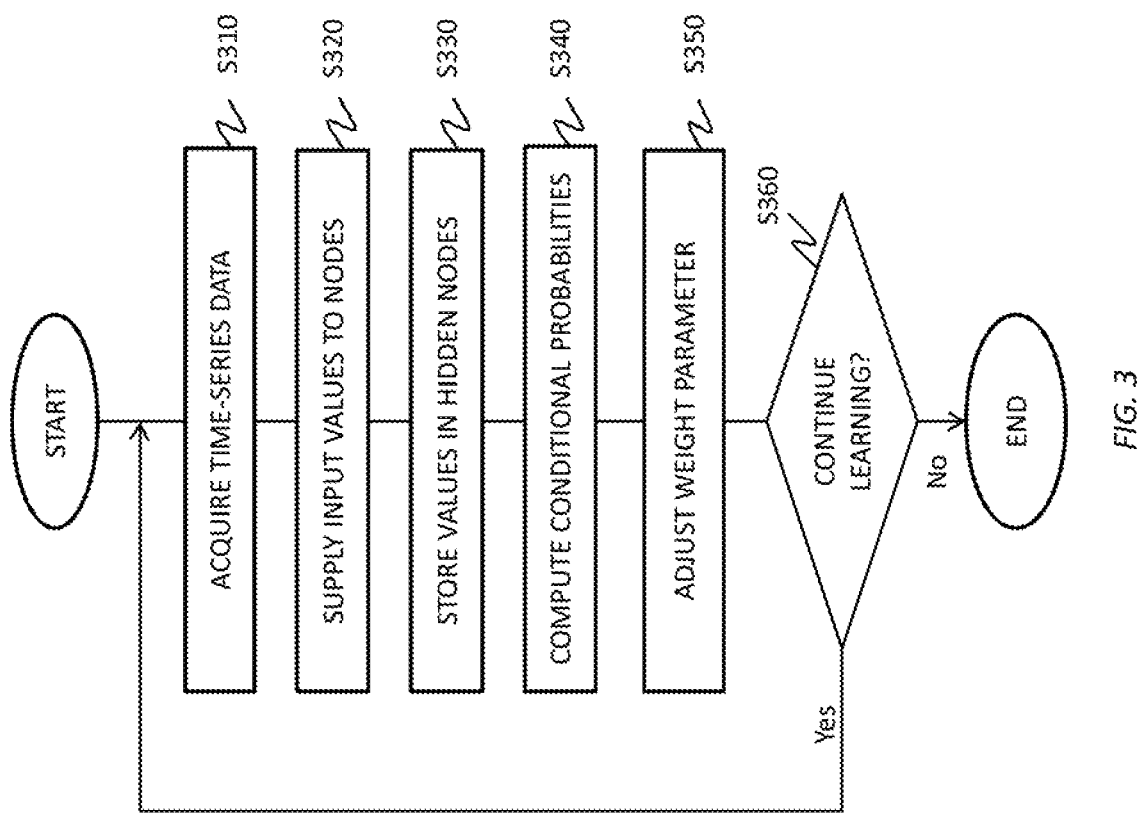
FIG. 3 shows a flow of an operation of the learning apparatus 100, according to an embodiment of the present invention.

FIG. 3 shows a flow of an operation of the learning apparatus 100 according to the present embodiment. In the present embodiment, the learning apparatus 100 may be operable to learn the model 10 corresponding to time-series input data and determine the learning parameters $u_{i, j, k}$ and $v_{i, j, l}$ and the bias parameter $b_j$, by executing the processing steps of S310 to S360. In the present embodiment, first, an example is described in which the determination of the weight parameters to the hidden nodes and the weight parameters to the input nodes is performed by the learning apparatus 100 using substantially the same operation.

First, the acquiring section 110 may acquire time-series data (S310). The acquiring section 110 may acquire time-series data of a duration equivalent to a total of T layers from the 0-th layer to the (-T+1)-th layer of the model 10. The acquiring section 110 acquires, for example, T pieces of image data in time-series that form the moving image data.

Then, the supplying section 120 may supply a plurality of input values corresponding to the input data of the time-series input data at one time point to the plurality of input nodes of the 0-th input layer of the model 10 (S320). Here, $x_{[1,I]}^{[0]}$ ($=x_j^{[0]}$, $1 \leq j \leq I$) denotes input data supplied to the 0-th input layer.

The supplying section 120 supplies, for example, I input values $x_j^{[0]}$ corresponding to input data $x_{[1,I]}^{[0]}$ of the time-series input data at the most recent time point to the corresponding nodes j of the 0-th input layer ($1 \leq j \leq I$). For example, the supplying section 120 supplies I pieces of pixel data included in the last piece of image data of T pieces of image data arranged in time series to form the moving image data to I nodes of the 0-th input layer. The supplying section 120 may supply a value of 1 or 0 as the pixel data to each node of the 0-th input layer. If the duration of the time-series input data is shorter than T, the supplying section 120 may supply the data to a number of layers from the 0-th input layer corresponding to the length of the time series, and may supply a value of 0, for example, to the nodes of the rest of the layers.

Then, the supplying section 120 may supply a plurality of input values corresponding to the input data sequence before the one time point to the plurality of nodes included in respective layers from the −1st input layer to the (−T+1)-th input layer of the model 10. Here, let $x_j^{(-T, -1]}$ denote input data supplied to layers from the −1st input layer to the (−T+1)-th input layer ($1 \leq j \leq I$). The term (−T, −1] indicates layers from the (−T+1)-th layer to the −1st layer. That is, the input data $x_j^{(-T, -1]}$ in the time-series data denotes a history up to the input data $x_j^{[0]}$, for example.

Next, the storage section 130 samples the values of a plurality of hidden nodes corresponding to the one time point, and respectively stores these values in the corresponding plurality of hidden nodes of the 0-th hidden layer (S330). The storage section 130 may arbitrarily or randomly input values of 1 or 0. The storage section 130 stores H sampled values in the corresponding hidden nodes j of the 0-th hidden layer, for example ($I+1 \leq j \leq I+H$).

The storage section 130 may store the values of the hidden nodes before the one time point respectively in a plurality of nodes in each of the corresponding hidden layers from the −1st hidden layer to the (−T+1)-th hidden layer of the model 10. Here, let $x_j^{-T, -1]}$ denote the values of the hidden nodes stored in the layers from the −1st hidden layer to the (−T+1)-th hidden layer ($I+1 \leq j \leq I+H$). That is, the values $x_j^{-T, -1]}$ input to the nodes of each common layer 12 before the one time point denote a history up to the input values $x_j^{[0]}$ input to the nodes of the 0-th common layer, for example ($1 \leq j \leq I+H$).

Then, the computing section 140 may compute conditional probabilities of each input value $x_j^{[0]}$ ($1 \leq j \leq I$) of an input node at the one time point, based on the input values $x_i^{(-T, -1]}$ ($1 \leq j \leq I+H$) of the plurality of nodes of the (−T+1)-th common layer to the −1st common layer and the weight parameter $W_{ij}^{[\delta]}$ (S340). The computing section 140 computes a probability $\langle x_j^{[0]} \rangle_\theta$ of the input value $x_j^{[0]}$ ($1 \leq j \leq I$) of the j-th node of the 0-th input layer being equal to 1 by substituting 1 for $x_j^{[0]}$ in the following expression, based on the history $x^{(-T, -1]}$ ($1 \leq j \leq I+H$) of the plurality of nodes of the common layer 12.

Expression 2

$$\langle X_j^{[0]} \rangle_\theta = p_{\theta, j}(x_j^{[0]} \mid x^{(-T, -1]}) = \frac{\exp(-\tau^{-1} E_{\theta, j}(x_j^{[0]} \mid x^{(-T, -1]}))}{1 + \exp(-\tau^{-1} E_{\theta, j}(x_j^{[0]} \mid x^{(-T, -1]}))}$$

In the present embodiment, an example is described in which the input value $x_j^{[0]}$ of each node is binary, i.e. 1 or 0, but the value of the input value $x_j^{[0]}$ is not limited to these values. Furthermore, in the step for computing the conditional probabilities of each input value $x_j^{[0]}$ ($1 \leq j \leq I$) of the 0-th input layer, the computing section 140 may compute the conditional probabilities of the values $x_j^{[0]}$ ($I+1 \leq j \leq I+H$) of the 0-th hidden layer.

Expression 2 is derived as a Boltzmann machine from a known probability formula. For example, θ denotes a set of parameters to be computed, and the formula θ=($b_j$, $u_{i,j,k}$, $v_{i,j,l}$) is established. In addition, τ may be a parameter that is dependent on a known "system temperature" of the Boltzmann machine, and may be preset by a user or the like. Also, $E_{\theta,j}(x_j^{[0]}|x^{-(-T,-1)})$ of Expression 2 is computed by using the following expression.

$$E_{\theta,j}(x_j^{[0]} | x^{(-T,-1)}) = -b_j x_j^{[0]} - \sum_{t=-T}^{-1} (x^{[t]})^T (x^{[t]}) W_{:,j}^{[-t]} x_j^{[0]} \quad \text{Expression 3}$$

Here, "T" denotes a transpose, ":" denotes 1 to n in a case where n (=I+H) denotes the number of nodes, and ":,j" indicates extraction of the j-th column. That is, the second term on the right side of Expression 3 is denoted by the following expression, for example.

$$\sum_{t=-T}^{-1} (x^{[t]})^T W_{:,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]} = \quad \text{Expression 4}$$

$$\sum_{i=1}^{N} \left( \sum_{k \in K} u_{i,j,k} \alpha_{i,j,k} - \sum_{l \in L} v_{i,j,l} \beta_{i,j,l} - \sum_{l \in L} v_{j,i,l} \gamma_{i,l} \right) x_j^{[0]}$$

Here, $\alpha_{i,j,k}$, $\beta_{i,j,l}$, and $\gamma_{i,l}$ are denoted by the following expressions.

$$\alpha_{i,j,k} \equiv \sum_{t=-T}^{-d_{ij}} \lambda_k^{-t-d_{ij}} x_i^{[t]} \quad \text{Expression 5}$$

$$\beta_{i,j,l} \equiv \sum_{t=-d_{ij}+1}^{-1} \mu_l^{-t} x_i^{[t]} \quad \text{Expression 6}$$

$$\gamma_{i,l} \equiv \sum_{t=-T}^{-1} \mu_l^{-t} x_i^{[t]} \quad \text{Expression 7}$$

Accordingly, $P_{\theta,j}(1|x_j^{(-T,-1)})$ obtained by substituting 1 for $x_j^{[0]}$ of Expression 2 can be computed from Expression 3 by substituting 1 for $x_j^{[0]}$ in expression 5. Note that predetermined initial values (for example, 0) may be substituted for the parameter set θ=($b_j$, $u_{i,j,k}$, $v_{i,j,l}$). In this way, the computing section 140 can compute a conditional probability $\langle x_j^{[0]} \rangle_\theta$ of each input value) (Plat the one time point which is denoted by Expression 2.

Then, the learning processing section 150 may adjust the parameter set θ=($b_j$, $u_{i,j,k}$, $v_{i,j,l}$) (S350). When adjusting the bias parameter $b_j$, the learning processing section 150 may determine a direction of the change in the bias parameter $b_j$ by using the following expression.

$$\frac{\partial}{\partial b_j} \log P_\theta(x_{[1,I]}^{[0]} | x^{(-T,-1)}) = \tau^{-1}(x_j^{[0]} - \langle X_j^{[0]} \rangle_\theta) \quad \text{Expression 8}$$

Here, $x_j^{[0]}$ on the right side of Expression 8 denotes an input value supplied as training data by the supplying section 120, and $\langle x_j^{[\ ]} \rangle_\theta$ on the right side denotes a probability computed by using Expression 2 ($1 \leq j \leq I$). The bias parameter $b_j$ for each input node ($1 \leq j \leq I$) may be adjusted and updated as denoted by the following expression by using Expression 8. Note that a coefficient c is a parameter predetermined by the user or the like.

$$b_j \leftarrow b_j + c \frac{1}{\tau}(x_j^{[0]} - \langle X_j^{[0]} \rangle_\theta) \quad \text{Expression 9}$$

That is, the learning processing section 150 adjusts the bias parameter $b_j$ so as to increase the conditional probability of the input value $x_j^{[0]}$ of the node of the 0-th input layer occurring, on a condition that the history $x^{(-T,-1)}$ of the common layer 12 has occurred. The learning processing section 150 may iteratively perform updating of the bias parameter $b_j$ denoted by Expression 9 and computing of the probability $\langle x_j^{[\ ]} \rangle_\theta$ denoted by Expression 2, to determine the bias parameter $b_j$. The learning processing section 150 stops updating the bias parameter $b_j$ and determines the bias parameter $b_j$ if a difference in the bias parameter $b_j$ before and after updating is less than or equal to a predetermined threshold. If a bias parameter $b_j$ is also set for a hidden node, the learning processing section 150 may determine the bias parameter $b_j$ of the hidden node in the same manner.

Alternatively, the learning processing section 150 may decide upon the bias parameter $b_j$ by iteratively updating the bias parameter $b_j$ a predetermined number of times. If a difference in the bias parameter $b_j$ before and after updating is greater than or equal to the predetermined threshold even after the bias parameter $b_j$ has been updated the predetermined number of times, the learning processing section 150 may stop updating the bias parameter $b_j$ and inform the user that the parameter does not converge.

Similarly, when updating the learning parameter $u_{i,j,k}$, the learning processing section 150 may determine the direction of a change in the learning parameter $u_{i,j,k}$ by using the following expression.

$$\frac{\partial}{\partial u_{i,j,k}} \log P_\theta(x_{[1,I]}^{[0]} | x^{(-T,-1)}) = \tau^{-1} \alpha_{i,j,k}(x_j^{[0]} - \langle X_j^{[0]} \rangle_\theta) \quad \text{Expression 10}$$

In addition, when updating the learning parameter $v_{i,j,l}$, the learning processing section 150 may determine the direction of a change in the learning parameter $v_{i,j,l}$ by using the following expression.

$$\frac{\partial}{\partial v_{i,j,l}} \log P_\theta(x_{[1,I]}^{[0]} | x^{(-T,-1)}) = \quad \text{Expression 11}$$
$$-\tau^{-1} \beta_{i,j,l}(x_j^{[0]} - \langle X_j^{[0]} \rangle_\theta) - \tau^{-1} \gamma_{j,i,l}(x_i^{[0]} - \langle X_i^{[0]} \rangle_\theta)$$

In the same manner as the updating of the bias parameter $b_j$, the learning processing section 150 may iteratively perform updating of the learning parameters $u_{i,j,k}$ and $v_{i,j,l}$ corresponding to the input nodes ($1 \leq j \leq I$) and computing of the probability $<x_j^{[0]}>_\theta$ to determine the learning parameters $u_{i,j,k}$ and $v_{i,j,l}$ corresponding to the input nodes ($1 \leq j \leq I$). Alternatively, the learning processing section 150 may iteratively perform an operation for updating the parameter set $\theta=(b_j, u_{i,j,k}, v_{i,j,l})$ and then computing the probability $<x_j^{[0]}>_\theta$ denoted by Expression 2 to determine the parameter set $\theta=(b_j, u_{i,j,k}, v_{i,j,l})$.

As described above, the learning processing section 150 according to the present embodiment can decide upon the learning parameters $u_{i,j,k}$ and $v_{i,j,l}$ and the bias parameter $b_j$ through learning. The learning apparatus 100 may then determine whether to continue learning (S360). The learning apparatus 100 may continue learning until it performs the learning process a predetermined number of times, or may continue learning until a stop command is input by the user. Alternatively, the learning apparatus 100 may continue learning until it can no longer acquire time-series data.

If the learning apparatus 100 continues learning (S360: YES), the process may return to step S310, in which the acquiring section 110 acquires the next time-series data, and the learning apparatus 100 may then perform learning of the model 10 based on the next time-series data. For example, the supplying section 120 supplies the 0-th input layer with the next image data in the image data acquired by the acquiring section 110. Furthermore, the storage section 130 samples the values of the hidden layers and stores these values in the 0-th hidden layer. Then, values held in the t-th common layer ($-T<t<0$) may be supplied to the (t−1)-th common layer. The values held in the (−T+1)-th layer may be deleted. The learning apparatus 100 may perform learning by using image data supplied to the layers from the 0-th input layer to the (−T+1)-th input layer as training data and using the values stored in the layers from the 0-th hidden layer to the (−T+1)-th hidden layer.

In this way, the supplying section 120 and the storage section 130 may sequentially acquire new input values $x_j^{[0]}$ at the next time point corresponding to the nodes of the 0-th common layer in the model 10. Then, the computing section 140 may compute a conditional probability $<x_j^{[0]}>_\theta$ of the new input value $x_j^{[0]}$ on a condition that the history has occurred for each common layer before the next time point. The learning processing section 150 may adjust the weight parameter so as to increase the conditional probability of the new input value occurring on the condition that this history has occurred.

If the learning processing section 150 stops learning (S360: NO), the learning processing section 150 may output the learning parameters $u_{i,j,k}$ and $v_{i,j,l}$ and the bias parameter $b_j$ that have been determined and store the parameters in the external database 1000 or the like.

As described above, the learning apparatus 100 according to the present embodiment may be operable to apply, to time-series input data that is input in time series, a model having a total of T layers by associating one time point with the 0-th common layer and an input data sequence before the one time point with T−1 layers. The learning apparatus 100 may be operable to apply a model having hidden nodes to each common layer 12. That is, the learning apparatus 100 may be operable to form a time-evolution Boltzmann machine that predicts input data at one time point on the basis of the input data sequence and hidden node values.

The learning apparatus 100 is able to learn the model by computing a conditional probability of the input value $x_j^{[0]}$ at the one time point occurring, based on the input value $x^{(-T,-1]}$, which is a history, for a model that takes time evolution into consideration. Furthermore, since the learning apparatus 100 learns the model using hidden nodes in addition to the time-series input data, the expressive ability and learning ability can be improved.

A description has been given of the learning apparatus 100 according to the present embodiment that sequentially acquires new input data from time-series input data and adjusts the weight parameter for each input data acquired. Instead of this configuration, the learning apparatus 100 may acquire time-series input data of a predetermined duration and then adjust the weight parameters. For example, the learning processing section 150 adjusts the weight parameters collectively for a plurality of time points in response to acquisition of new input data at a plurality of time points corresponding to D layers.

Figure 4:
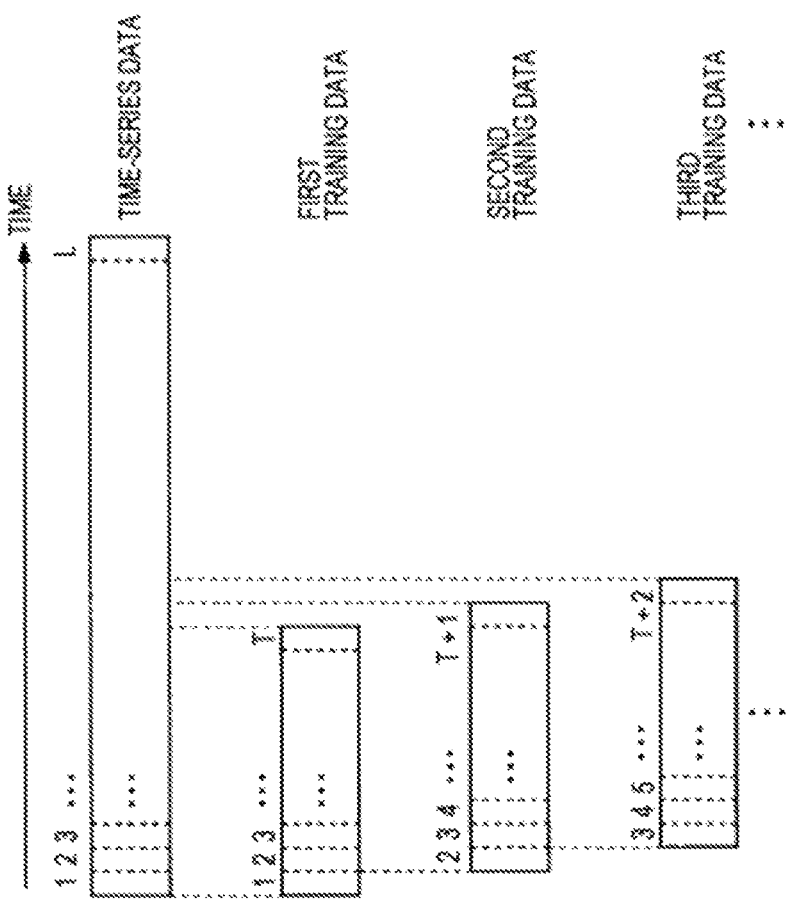
FIG. 4 shows an example of structures of time-series data and training data for use in learning, according to an embodiment of the present invention.

FIG. 4 shows an example of structures of time-series data and training data for use in learning in the present embodiment. In FIG. 4, the horizontal axis denotes time. FIG. 4 shows an example in which the learning apparatus 100 uses time-series data $y^{[1, L]}$ having a duration L that is longer than a duration T of time-series data $y^{[1, T]}$ used as training data by the learning apparatus 100 during learning. In this case, the learning processing section 150 may be operable to adjust weight parameters for a plurality of time points all together, in response to input data at a plurality of time points being newly acquired.

The learning apparatus 100 first performs learning using, as first training data, a time-series data segment of the time-series data from a time 1 to a time T. In this case, as described in FIG. 3, the learning apparatus 100 may perform learning by setting the time-series data and corresponding hidden layer values from the time 1 to the time T as each input value of the common layer 12 at the one time point in order, and incrementally shifting the time points one at a time toward the future. The learning apparatus 100 may use data at a time T as each input value $x_j^{[0]}$ at the one time point, and continue learning until the time-series data from the time 1 to a time T−1 becomes the input data sequence $x^{(-T, -1]}$ (i.e. the history).

Next, the learning apparatus 100 performs learning using, as second training data, a time-series data segment of the time-series data from a time 2 to a time T+1. The learning apparatus 100 may sequentially use each of D pieces of data in the second training data as the input value $x_j^{[0]}$ at the one time point. In this case, the learning apparatus 100 may shift the time point in the interval from the time 2 to the time T+1 one time point at a time toward the future and use, as the history, the corresponding time-series data and hidden nodes of the interval from the time 2 to the time T. In this way, the learning apparatus 100 may adjust the parameters D times for the D input values $x_j^{[0]}$ and the corresponding D histories. That is, the learning apparatus 100 may use a stochastic gradient technique in which the learning method described with Expressions 8 to 11 is performed.

Alternatively, the learning apparatus 100 may acquire D time-series data sets, generate a plurality of training data sets from time-sequence data segments of a duration of L, and collectively perform learning for D layers. Specifically, the learning apparatus 100 may perform the stochastic gradient technique described using Expressions 8 to 11 collectively for D layers, by using the following expression.

$$\theta \leftarrow \theta + \eta \sum_{x \in \{y^{(t,t+T-1]}\,|\,0 \leq t < D\}} \nabla_\theta \log P_\theta(x_{[1,l]}^{[0]} \,|\, x^{(-T,-1]}) \quad \text{Expression 12}$$

Figure 5:
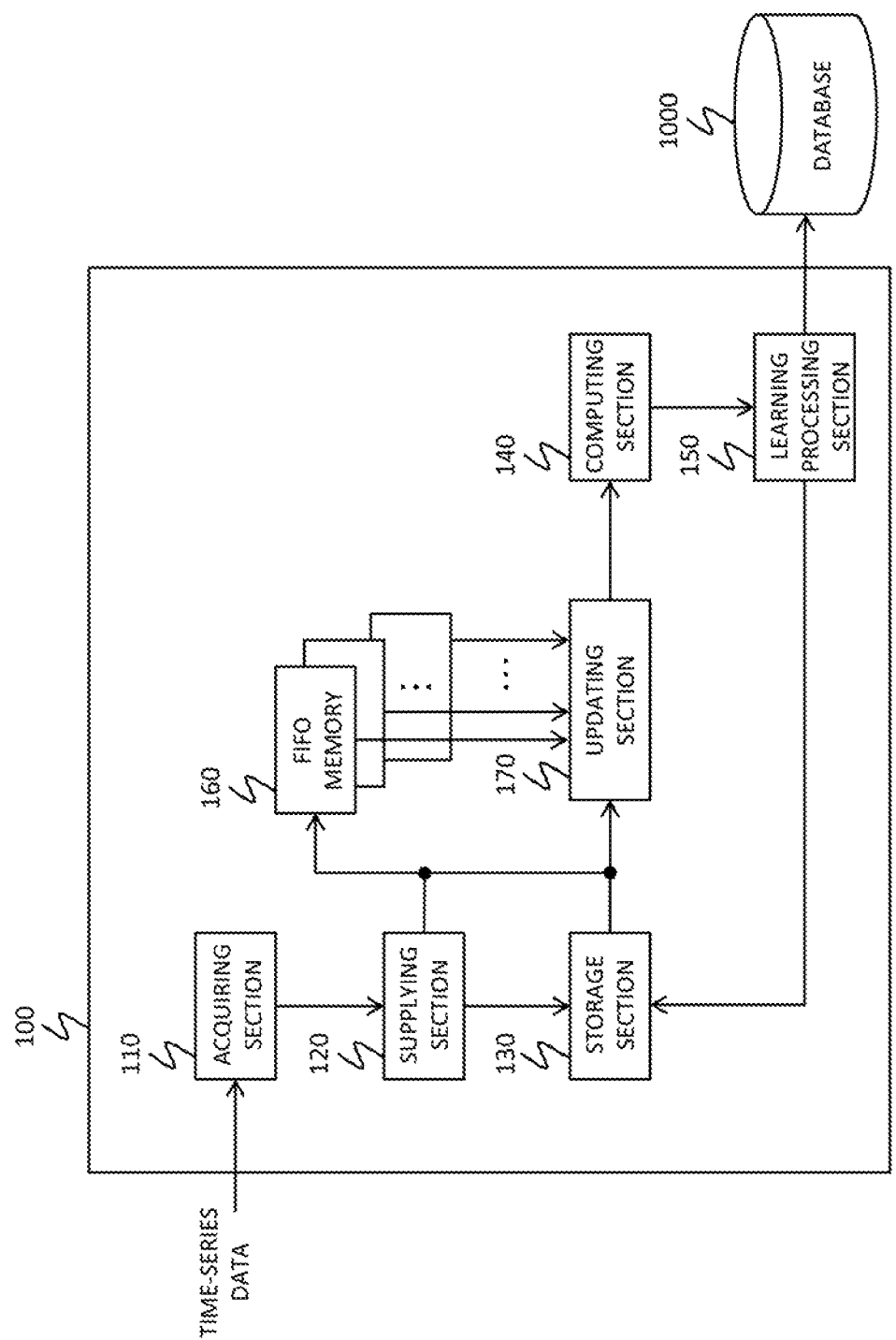
FIG. 5 shows a first modification of the learning apparatus 100 according to an embodiment of the present invention.

FIG. 5 shows a first modification of the learning apparatus 100 according to the present embodiment. Components of the learning apparatus 100 shown in FIG. 5 that perform substantially the same operations as those of the learning apparatus 100 according to the embodiment illustrated in FIG. 1 are denoted by the same reference numerals, and a description thereof is omitted. In a case where time-series data of a duration L such as described in FIG. 4 is provided, the learning apparatus 100 according to the present modification may be operable to efficiently update parameters by using FIFO memories and learn a model corresponding to the time-series input data. The learning apparatus 100 according to the present modification further includes FIFO memories 160 and an updating section 170.

Each of the FIFO memories 160 may sequentially store input data and output the stored data after a predetermined number of storages have been performed. Each of the FIFO memories 160 may be a memory that first outputs data that has been stored first (FIFO: First In, First Out).

Each of the FIFO memories 160 may sequentially store an input value of the common layer 12 and output the input value after a predetermined number of storages have been performed. The learning apparatus 100 may include a plurality of FIFO memories 160, the number of which is greater than or equal to the number of nodes n of the model. The plurality of FIFO memories 160 is desirably provided to have a one-to-one correspondence with the plurality of nodes of the common layer 12. That is, each of the plurality of FIFO memories 160 may be provided in a manner to store a history for a respective node of the common layer 12 or to update the history thereof.

The plurality of FIFO memories 160 are connected to the acquiring section 110 and the storage section 130, and sequentially store input values corresponding to new input data of the common layer 12. The plurality of FIFO memories 160 are also connected to the updating section 170 and sequentially supply the data stored therein to the updating section 170.

The updating section 170 may be operable to update a plurality of update parameters that are based on the hidden nodes and the input data sequence of the time-series input data before the one time point, from values at a prior time point to values at the one time point, on the basis of values of the update parameters and values of the hidden nodes and input values corresponding to the input data to be reflected next. The updating section 170 may update the update parameters by using values input to the FIFO memories 160 and values output from the FIFO memories 160. The updating section 170 may be connected to the acquiring section 110 and the storage section 130, and may receive values input to the FIFO memories 160. Alternatively, the updating section 170 may receive values input to the FIFO memories 160 from the acquiring section 110 via the supplying section 120.

Here, the update parameters are $\alpha_{i,j,k}$ and $\gamma_{i,l}$ shown in Expressions 5 and 7. In this case, the update parameters are based on input values i ($1 \leq i \leq I$) corresponding to input data of the input data sequence at each time point and the predefined parameters $\lambda_k'1$ and $\mu_l'2$ of the weight parameter $W_{ij}^{[\delta]}$ between this input value i and the target input node j ($1 \leq j \leq I$) or hidden node j ($I+1 \leq j \leq I+H$), for example. As another example, the update parameters are based on the hidden node i ($I+1 \leq i \leq I+H$) at each time point and the predefined parameters $\lambda_k'1$ and $\mu_l'2$ of the weight parameter $W_{ij}^{[\delta]}$ between this hidden node i and the target input node j ($1 \leq j \leq I$) or hidden node j ($I+1 \leq j \leq I+H$), for example.

The update parameters may be updated every time the acquisition of the time-series input data by the acquiring section 110 and the storage of the sampling values by the storage section 130 are performed sequentially. The above-described learning apparatus 100 according to the present modification may be operable to learn a modification of the model 10. The modification of the model 10 is described with reference to FIG. 6.

Figure 6:
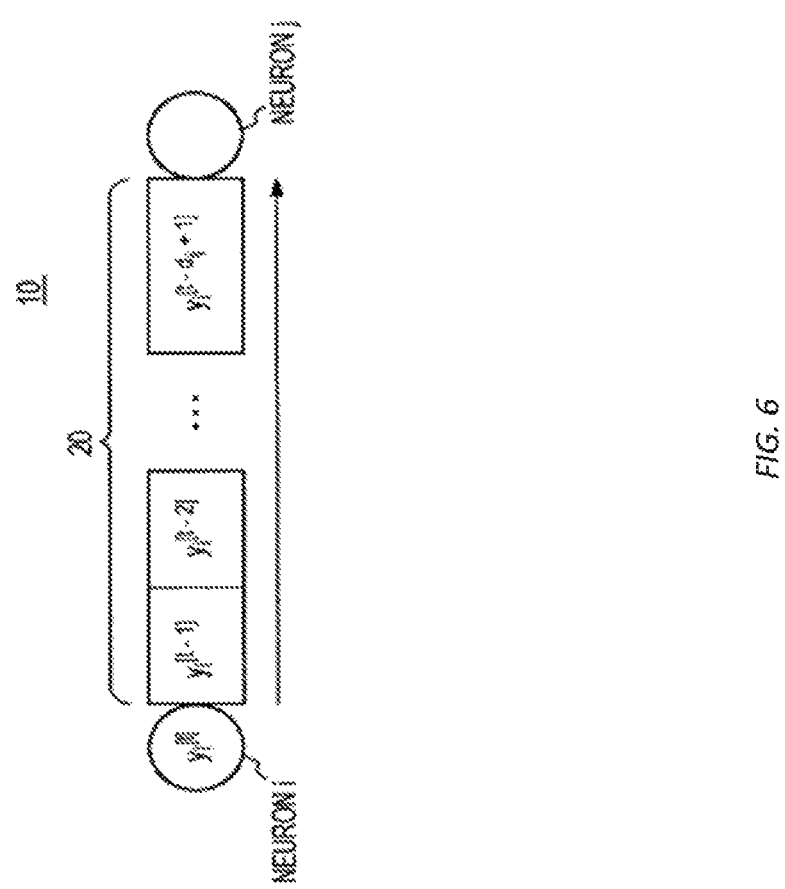
FIG. 6 shows a modification of the model 10, according to an embodiment of the present invention.

FIG. 6 shows a modification of the model 10 according to the present embodiment. The model 10 according to the modification needs not have the layered structure including T layers shown in FIG. 2. FIG. 6 shows an example of a model corresponding to one of the FIFO memories 160. Accordingly, the overall configuration of the model 10 according to the present modification includes a storage area that is equivalent to the 0-th common layer in FIG. 2 including the training data, and a number of the configurations illustrated in FIG. 6 equal to the number of nodes n (=I+H). Neurons i and j and a FIFO sequence 20 of the model 10 according to the present modification are described below.

The neuron i may be equivalent to the input terminal of the FIFO memory 160. An input value $y_i^{[t]}$ ($1 \leq i \leq I$) of each node in the input data of the input data sequence at each time point t and a corresponding value $y_i^{[t]}$ among the values $y_i^{[t]}$ ($I+1 \leq i \leq I+H$) of the hidden nodes at each time point are sequentially input to the neuron i. The neuron i may set the value $y_i^{[t]}$ input thereto as the current input value. Then, at a time point t+1, the neuron i may supply the input value $y_i^{[t]}$ input at the time point t to the updating section 170 and to the FIFO sequence 20 as the previous input value and may hold the input value $y_i^{[t+1]}$ at the time point t+1 as the current input value.

The FIFO sequence 20 may store $d_{ij}-1$ of the latest input values received from the neuron i. The FIFO sequence 20 may supply the $d_{ij}-1$ input values stored therein to the updating section 170. The updating section 170 may be operable to compute the values of the update parameters denoted by Expression 6 by using the input values supplied by the FIFO sequence. If the FIFO sequence 20 holds input values from the time point t−1 to the time point $t-d_{ij}+1$, the FIFO sequence 20 is denoted by the following expression.

$$q_{i,j} \equiv (y_i^{[t-1]}, y_i^{[t-d_{ij}+2]}, y_i^{[t-d_{ij}+1]})$$  Expression 13:

After the input value $y_i^{[t1]}$ is input to the neuron i at the time point t1, the FIFO sequence 20 may store the input value $y_i^{[t1]}$ up until a time point t3 ($=t1+d_{ij}-1$) which is a predetermined time period $d_{ij}-1$ after the next time point t2 ($=t1+1$) of the time point t1. At the next time point t4 ($=t3+1=t1+d_{ij}$), the FIFO sequence 20 may supply the input value $y_i^{[t1]}$ to the neuron j. The input value $y_i^{[t1]}$ supplied to the neuron j at the time point t4 is immediately supplied to the updating section 170 at the time point t4. However, the input value $y_i^{[t1]}$ that the neuron j has received from the FIFO sequence 20 at the time point t4 does not serve as an input for the neuron j, and the input value $y_i^{[t4]}$ may be input to the neuron j at the time point t4.

The neuron j may be equivalent to the output terminal of the FIFO memory 160, and the neuron j may receive the input value $y_i^{[t1]}$ input to the neuron i at the time point t1, via the FIFO sequence after the time period $d_{ij}$, i.e. at the time point $t1+d_{ij}$. That is, the model 10 from the neuron i to the neuron j via the FIFO sequence 20 may correspond to the FIFO memory 160 that stores $d_{ij}$ pieces of input data. In addition, the neuron i of the model 10 according to the modification may correspond to, for example, a node for an input data sequence such as a node i of the (−δ)-th common layer of the model 10 shown in FIG. 2, and in this case the neuron j may correspond to, for example, the node j of the 0-th common layer. At the time point $t1+d_{ij}$, the neuron j may supply the received input value $y_i^{[t1]}$ to the updating section 170.

As described above, the model 10 according to the present modification may supply the input values at the time point t−1 and the time point $t−d_{ij}+1$ to the updating section 170 at the time point t. In this way, the updating section 170 can update the update parameters by adding the corresponding input value in the input data to be reflected next to the update parameters for the time point before the one time point, and then multiplying the resulting sum by a predetermined constant. Note that the update parameters denoted by Expression 8 may be computed in accordance with Expression 8 by using the input values stored in the FIFO sequence 20 that are supplied to the updating section 170.

For example, the update parameter $\gamma_{i,l}$ denoted by Expression 7 can be updated by using the input values supplied to the updating section 170 and the second predefined parameter. Specifically, the updating section 170 can compute the update parameter $\gamma_{i,l}$ to be used in the current learning by performing computing at the time point t according to the following expression by using the prior update parameter $\gamma_{i,l}$ and the input value $y_i^{[t−1]}$ received from the neuron i at the time point t.

$$\gamma_{i,l} \leftarrow \mu_l(\gamma_{i,l}+y_i^{[t-1]}) \qquad \text{Expression 14:}$$

Figure 7:
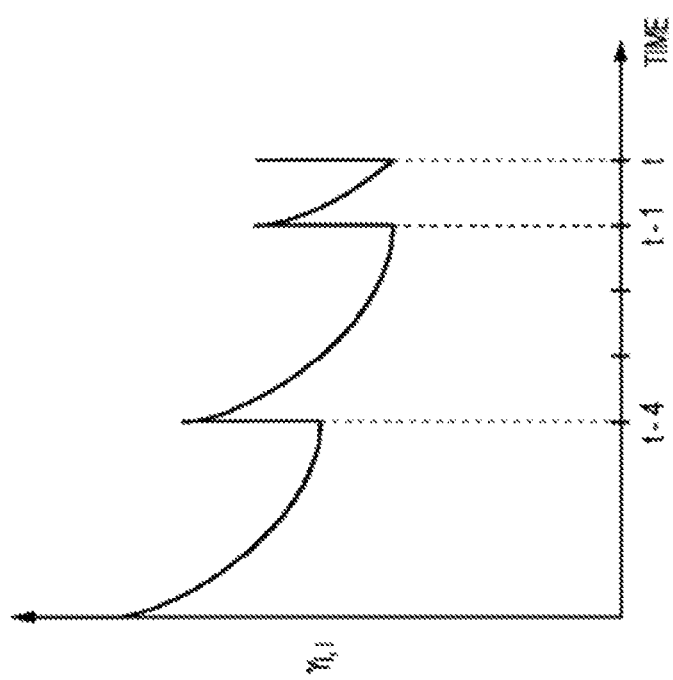
FIG. 7 shows an example of a temporal change in the update parameter $\gamma_{i,l}$, according to an embodiment of the present invention.

FIG. 7 shows an example of a temporal change in the update parameter $\gamma_{i,l}$ according to the present embodiment. FIG. 7 shows an example in which values greater than 0 (for example, 1) are input to the neuron i as the input value at time points t−5, t−2, and t−1, and these input values are supplied to the updating section 170 at time points t−4, t−1, and t. The second predefined parameter 1.44 is a parameter whose value gradually decreases as the time point difference increases. Accordingly, the update parameter $\gamma_{i,l}$ computed by the updating section 170 tends to decrease as time passes from when the input value of 1 is input to when the next input is given.

The update parameter $\alpha_{i,j,k}$ denoted by Expression 5 can be updated by using the input values supplied to the updating section 170 and the first predefined parameter $\lambda_k$. Specifically, the updating section 170 can compute the update parameter $\alpha_{i,j,k}$ to be used in the current learning by performing computing at the time point t according to the following expression, by using the prior update parameter $\alpha_{i,j,k}$ and the input value $y_i^{[t-dij]}$ received from the neuron j at the time point t.

$$\alpha_{i,j,k} \leftarrow \lambda_k(\alpha_{i,j,k}+y_i^{[t-dij]}) \qquad \text{Expression 15:}$$

Figure 8:
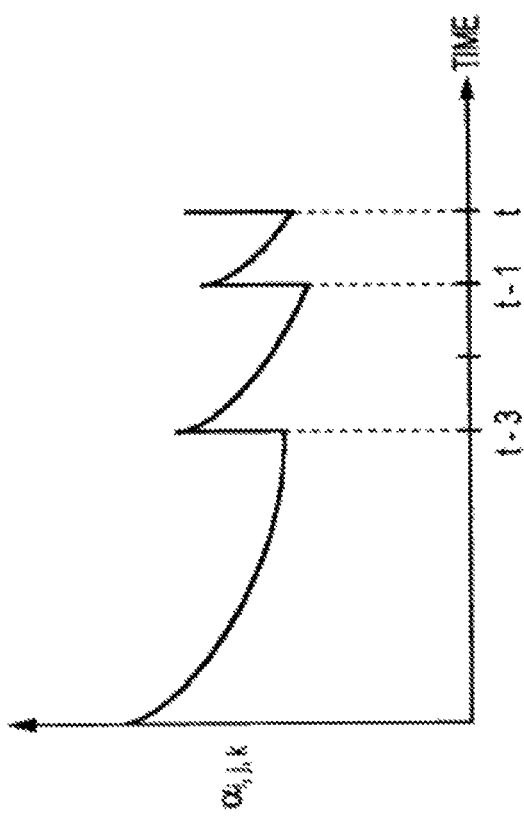
FIG. 8 shows an example of a temporal change in the update parameter $\alpha_{i,j,k}$, according to an embodiment of the present invention.

FIG. 8 shows an example of a temporal change in the update parameter $\alpha_{i,j,k}$ according to the present embodiment. FIG. 8 shows an example in which values greater than 0 (for example, 1) are supplied to the neuron j as the input value at time points t−3, t−1, and t. The first predefined parameter $\lambda_k$ is a parameter whose value gradually decreases as the time point difference increases. Accordingly, the update parameter $\alpha_{i,j,k}$ computed by the updating section 170 tends to decrease as time passes from when the input value of 1 is input to when the next input is given.

As described above, the learning apparatus 100 according to the present modification can update the update parameters $\alpha_{i,j,k}$ and $\gamma_{i,l}$ by applying the model 10 shown in FIG. 6 using the FIFO memories 160 and the updating section 170. Note that the updating section 170 can apply the model 10 according to the present modification, for example, by acquiring the input values $x_i^{[t−1]}$ at the time point t−1 from the input data input to the FIFO memories 160 and acquiring the input values $x^{[t−dij]}$ at the time point $t−d_{ij}$ from the output of the FIFO memories 160.

In addition, the learning apparatus 100 may update the parameter $\beta_{i,j,l}$ through substantially the same operation as the operation described in FIG. 3. Specifically, the computing section 140 can compute the parameter $\beta_{i,j,l}$ by determining the sum of products of the second predefined parameter $\mu_l$ and the input value $x_i$ ($y_i$ in the present modification) for time points from t−1 to $t−d_{ij}+1$ as indicated by Expression 6.

In this way, the computing section 140 according to the present modification can compute, by using the plurality of update parameters, conditional probabilities of input data values at one time point on the condition that the hidden node values and input data sequence have occurred. Then, the learning processing section 150 can determine the learning parameters $u_{i,j,k}$ and $v_{i,j,l}$ and the bias parameter $b_j$ by performing substantially the same operation as the operation described in FIG. 3.

In other words, the learning apparatus 100 according to the present embodiment can determine the weight parameter and bias parameters in a manner to increase the probability of predicting the input value to be input to the input layer 14 of the common layer 12, based on the past values that have been input to the common layer 12 of the model 10 before the one time point. Furthermore, the learning apparatus 100 can improve the prediction accuracy, the expressive ability, the learning efficiency, and the like of the input values input to the input layer 14 by having the common layer 12 include the hidden layer 16 in addition to the input layer 14.

The learning apparatus 100 according to the present embodiment described above is an example in which a value that is unrelated to the prediction made by the learning apparatus 100 is sampled and input as the hidden node value to be input to the hidden layer 16. Instead of this, the learning apparatus 100 may determine the hidden node value by using a history of the conditional probability of the values of the nodes of the common layer 12. The learning apparatus 100 may determine the weight parameter to a hidden node by using this conditional probability history. The learning apparatus 100 can improve the prediction accuracy by using the conditional probability history of nodes of the common layer 12 to determine the weight parameter to the hidden node and the hidden node value.

In this case, the computing section 140 may compute the conditional probability $p_{j,t}$ of the value of a node j of the common layer 12 at one time point t based on the values input to the corresponding node j of the common layer 12 at each time point before the one time point t, and store this conditional probability in the storage section or the like. In addition to the computation of the conditional probability of each input value of the input layer 14 at the one time point described above, the computing section 140 may compute the conditional probability of each hidden node in the layer 16 at the one time point in the same manner. That is, the computing section 140 may use the plurality of update parameters to compute the conditional probability of the value of each hidden node and each input data value at the one time point on the condition that an input data sequence has occurred. Here, the computing section 140 may store the conditional probability $p_{j,t}$ in a FIFO or the like.

The computing section 140 may be operable to compute a total likelihood, after the learning by the learning apparatus 100 has continued. The computing section 140 computes the total likelihood $p_3$ as shown in the following expression, based on the conditional probabilities $p_{j,t−K+1}, p_{j,t−K+2}, \ldots$ , $p_{j,t}$ computed by K instances of learning from the time point t−K+1 to the time point t, for example. The total likelihood $p_3$ in Expression 16 indicates a total sum of the conditional probabilities, as an example, but the total likelihood $p_i$ may be at least one of a sum, weighted sum, product, or weighted product of the conditional probabilities. Furthermore, K may be an integer greater than or equal to 2, and if the computing section 140 stores the conditional probabilities $p_{j,t}$ in a FIFO or the like, the length of the FIFO sequence may be equal to the value of K.

$$p = \sum_{s=t-k+1}^{t} p_s$$ Expression 16

The computing section 140 may supply the total likelihood $p_3$ to the storage section 130. The storage section 130 may sample the values $x_j^{[t]}$ of the hidden nodes of the hidden layer 16 at the one time point, based on the most recent likelihood $p_{j,t}$. That is, the storage section 130 according to the present embodiment may be operable to sample the value of each hidden node at the one time point, by using the conditional probability of the value of each hidden node at the one time point. For example, the storage section 130 samples the values of the hidden nodes based on the history of the conditional probabilities computed by the computing section 140. That is, the storage section 130 may sample the values of the hidden nodes after the learning operation of the learning processing section 150 has been performed a plurality of times. The storage section 130 may store a value of 0 in the hidden nodes as the sampling value, until the learning operation of the learning processing section 150 has been performed a plurality of times.

The storage section 130 may store a value of 1 or 0 in the hidden node j as the sampling result, according to the result of a comparison between the value of the total likelihood $p_3$ and a threshold value. In this way, when predicting the time series data to be input to the input layer 14, the storage section 130 can store a more preferable value as the hidden node value by performing sampling based on the history of past conditional probabilities.

The learning processing section 150 may be operable to determine the weight parameter based on the total likelihood $p_3$. In this case, the learning processing section 150 may compute update amounts $\Delta u_{i,j,k}$ and $\Delta v_{i,j,k}$ for the learning parameters $u_{i,j,k}$ and $v_{i,j,k}$ in the weight parameter for one hidden node j at the one time point. For example, the learning processing section 150 may compute these update amounts $\Delta u_{i,j,k}^{[t]}$ and $\Delta v_{i,j,k}^{[t]}$ as shown in the following expression, based on the value $x_j^{[t]}$ of the one hidden node j at the one time point t and on the conditional probability $\langle X_j^{[t]} \rangle$ of the value of this hidden node j at the one time point t on the condition that the input data sequence has occurred (I+1≤j≤I+H).

$$\Delta u_{i,j,k}^{[t]} = \alpha_{i,j,k}^{[t-1]}(x_j^{[t]} - \langle X_j^{[t]} \rangle)$$

$$\Delta v_{i,j,j}^{(1)[t]} = \beta_{i,j,j}^{[t-1]}(\langle X_j^{[t]} \rangle - x_j^{[t]})$$

$$\Delta v_{i,j,j}^{(2)[t]} = \gamma_{i,j,j}^{[t-1]}(\langle X_i^{[t]} \rangle - x_i^{[t]})$$ Expression 17:

Here, the update amount $\Delta v_{i,j,k}^{[t]}$ is equal to $\Delta u_{i,j,k}^{(1)[t]} + \Delta u_{i,j,k}^{(2)[t]}$. The conditional probability $\langle X_j^{[t]} \rangle$ of the value of the hidden node j may be computed by the computing section 140 using Expression 2. The learning processing section 150 may store the computed update amounts $\Delta v_{i,j,k}^{[t]}$, $\Delta u_{i,j,k}^{(1)[t]}$, and $\Delta u_{i,j,k}^{(2)[t]}$ in the storage section or the like. The learning processing section 150 may be operable to store the update amounts $\Delta v_{i,j,k}^{[t]}$, $\Delta u_{i,j,k}^{(1)[t]}$, and $\Delta u_{i,j,k}^{(2)[t]}$ computed for one time point in the FIFO sequence. That is, the learning processing section 150 may be operable to update the learning parameters based on update amounts computed in the past.

The learning processing section 150 changes the ratio by which the update amounts are reflected in the learning parameters, according to the conditional probability of input data occurring at a following time point that is after the one time point t, for example. In this case, the learning processing section 150 may change the ratio by which the update amounts are reflected in the learning parameters according to the conditional probability of a hidden node value occurring at a plurality of following time points that are after the one time point. In the present embodiment, an example is described in which the learning processing section 150 changes the ratio by which the update amounts are reflected in the learning parameters according to the total likelihood $p_3$ after the one time point.

The learning processing section 150 may update the learning parameters as shown in the following expression, based on the total likelihood $p_i$ computed by K instances of learning from the time point t−K+1 to the time point t and on the update amount at the time point t−K+1, for example. Here, K may be an integer greater than or equal to 2, and if the learning processing section 150 stores the update amounts in the FIFO sequence, the length of the FIFO sequence may be equal to the value of K.

$$u_{i,j,k} \leftarrow u_{i,j,k} + \eta_1 p_j \Delta u_{i,j,k}^{[t-k+1]}$$

$$v_{i,j,j} \leftarrow v_{i,j,j} + \eta_1 p_j (\Delta v_{i,j,j}^{(1)[t-k+1]} + \Delta v_{i,j,j}^{(2)[t-k+1]})$$ Expression 18:

Here, $\eta_1$ may be a constant for adjusting the update amount. Alternatively, $\eta_1$ may be a coefficient whose value becomes smaller according to an increase in the number of updates. Yet further, $\eta_1$ may have a value of substantially 1 at the stage when the learning processing section 150 begins learning, and may be a coefficient whose value becomes smaller according to the amount of learning occurring as time progresses from the time point t. For example, $\eta_1 = \eta_{10}/t^2$. Furthermore, $\eta_1$ may be a coefficient whose value becomes smaller according to the update amount. For example, $\eta_1 = \eta_{10}/(\Sigma \Delta u_{i,j,k}^2)^{1/2}$. Here, To may be a predetermined constant.

In the manner described above, the learning processing section 150 may update the learning parameters of a hidden node at one time point according to the conditional probabilities computed at time points before the one time point. In this way, the learning apparatus 100 can more strongly reflect the update amounts at time points before the one time in the learning parameters, in response to the predicted probability of an input value of an input node being large due to the weight parameters at time points before the one time point. That is, the learning apparatus 100 can update the weight parameters of the hidden nodes in a manner to increase the conditional probabilities.

If a FIFO sequence is used to perform an update of such a weight parameter, the learning processing section 150 may extract from the FIFO sequence the update amounts $\Delta v_{i,j,k}^{[t-K+1]}$, $\Delta u_{i,j,k}^{(1)[t-K+1]}$, and $\Delta u_{i,j,k}^{(2)[t-K+1]}$ of a past time point (e.g. t−K+1) at the following time point (e.g. t) or a time point thereafter. The learning processing section 150 may update the ratio by which the update extracted from the FIFO sequence are reflected in the learning parameters according to the conditional probabilities of hidden node values occurring at the following time point t. For example, the learning processing section 150 may multiply the total likelihood $p_i$ respectively by each update amount. In this way, the learning processing section 150 can efficiently perform the update of the weight parameters as described above.

As described above, the learning apparatus 100 according to the present embodiment can learn a model 10 in a manner to predict input data at one time point, based on an input data series before the one time point in the time-series input data. Furthermore, the learning apparatus 100 can improve the expressive power, learning power, and the like by including hidden nodes. With such a learning apparatus 100, there are cases where it is relatively difficult to perform the learning.

For example, for a hidden node value at one time point, it is difficult to evaluate whether this hidden node value was effective if a certain amount of time points have not yet passed. Accordingly, if hidden nodes are used, there are cases where the learning accuracy of the learning apparatus 100 for the weight parameter between the input data series and the hidden nodes at the one time point is lower than the learning accuracy for the weight parameter between the input data series and the input nodes at the one time point. Furthermore, if there is a characteristic data trend in the input data series, there are cases where the learning is affected by this data trend and overfitting is performed, causing unsuitable learning for future data prediction.

Therefore, the learning apparatus 100 may be operable to further improve the learning by changing the order in which the time-series input data is input to the model 10 and performing a bidirectional learning process. The following describes such a learning apparatus 100.

The present embodiment describes an example in which the learning apparatus 100 is operable to learn a model 10 in a manner to predict input data at one time point, based on the input data series before the one time point in the time-series input data. In this way, the learning apparatus 100 creates a first model that is a forward model that performs a learning process in which the time-series input data is input to the model 10 in order from past data to future data.

Figure 9:
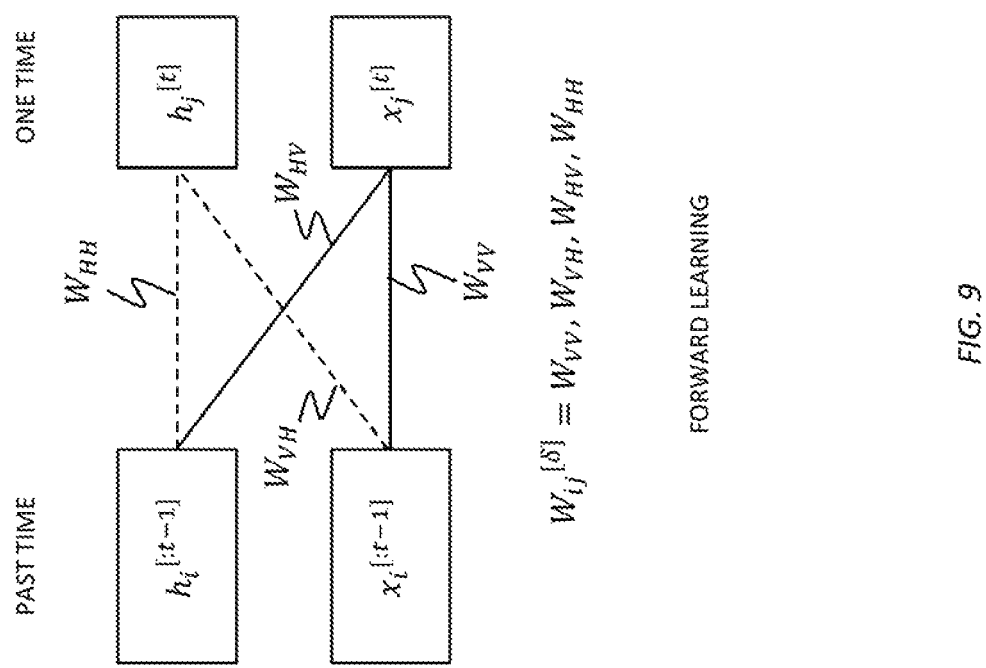
FIG. 9 shows an exemplary schematic configuration of the first model, according to an embodiment of the present invention.

FIG. 9 shows an exemplary schematic configuration of the first model according to the present embodiment. FIG. 9 shows a schematic configuration of the first model corresponding to the model 10 shown in FIG. 2. In FIG. 9, the value of the node j in the input layer 14 at the one time point t is indicated by $x_j^{[t]}$ ($1 \le j \le I$), and the value of the node j in the hidden layer 16 at the one time point t is indicated by $h_j^{[t]}$ ($I+1 \le j \le H$). Furthermore, the value of the node i in a plurality of input layers 14 before the one time point t is indicated by $x_i^{[:t-1]}$ ($1 \le i \le I$), and the value of the node i in the hidden layer 16 before the one time point t is indicated by $h_i^{[:t-1]}$ ($I+1 \le i \le H$).

As described above, the first model may include a plurality of input nodes j that sequentially input a plurality of input values at each time point in a time-series input data sequence, and a weight parameter $W_{ij}^{[\delta]}$ between each input node j and each input value $x_i^{[:t-1]}$ at the time points before the time point corresponding to the plurality of input nodes j. Here, the weight parameter between a plurality of input layers 14 before the one time point and the input layer 14 at the one time point is $W_{VV}$. Furthermore, the first model may include a weight parameter $W_{ij}^{[\delta]}$ between each input node j and each of a plurality of hidden nodes i corresponding to time points before the time point corresponding to the plurality of input nodes j. Here, the weight parameter between the plurality of hidden layers 16 before the one time point t and the input layer 14 at the one time point t is $W_{HV}$.

The first model may further include a weight parameter $W_{ij}^{[\delta]}$ between each input node i corresponding to a time point before the time point corresponding to the plurality of input nodes j and each hidden node j corresponding to the time point corresponding to the plurality of input nodes j. Here, the weight parameter between the plurality of input layers 14 before the one time point t and the hidden layer 16 at the one time point t is $W_{VH}$. The first model may further include a weight parameter $W_{ij}^{[\delta]}$ between each of the plurality of hidden nodes i corresponding to a time point before the time point corresponding to the plurality of input nodes j and each hidden node j corresponding to the time point corresponding to the plurality of input nodes j. Here, the weight parameter between the plurality of hidden layers 16 before the one time point t and the hidden layer 16 at the one time point t is $W_{HH}$.

With b representing a bias parameter of the first model, the conditional probability p of the input node j and the hidden node j at the one time point may be calculated based on the following expression. The update of each parameter in the first model is as described above.

$$p(x_j^{[t]}, h_j^{[t]} \mid x_i^{[:t-1]}, h_i^{[:t-1]}) \sim \qquad \text{Expression 19}$$

$$\exp\left( b^T \begin{pmatrix} x_j^{[t]} \\ h_j^{[t]} \end{pmatrix} + \sum_{\delta>0} (x_i^{[t-\delta]}, h_i^{[t-\delta]})^T W_{ij}^{[\delta]} \begin{pmatrix} x_j^{[t]} \\ h_j^{[t]} \end{pmatrix} \right)$$

Here, since the time-series input data for learning is already known, the order in which this time-series input data is input to the model 10 is not limited to the forward order from past data to future data, as in the first model. The learning apparatus 100 may be operable to learn the model 10 in a manner to predict input data at one time point based on the input data series after the one time point in the time-series input data. In this way, the learning apparatus 100 creates a second model that is a backward model that performs a learning process in which the time-series input data is input to the model 10 in order from future data to past data.

Figure 10:
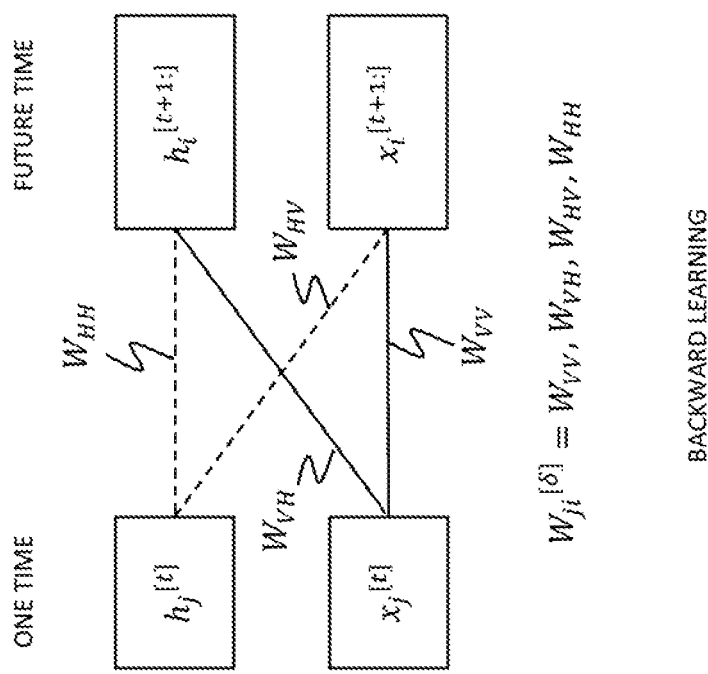
FIG. 10 shows an exemplary schematic configuration of the second model, according to an embodiment of the present invention.

FIG. 10 shows an exemplary schematic configuration of the second model according to the present embodiment. FIG. 10 shows a schematic configuration of the second model corresponding to the model 10 shown in FIG. 2. In FIG. 10, the value of the node j in the input layer 14 at the one time point t is indicated by $x_j^{[t]}$ ($1 \le j \le I$), and the value of the node j in the hidden layer 16 at the one time point t is indicated by $h_j^{[t]}$ ($I+1 \le j \le H$). Furthermore, the value of the node i in a plurality of input layers 14 after the one time point t is indicated by $x_i^{[t+1:]}$ ($1 \le i \le I$), and the value of the node i in the hidden layer 16 after the one time point t is indicated by $h_i^{[t+1:]}$ ($I+1 \le i \le H$). In other words, if the learning operation is performed using the second model, the learning apparatus 100 inputs the data to the model 10 from the temporally newest data in the time-series input data.

In this case, the second model may include a plurality of input nodes i that sequentially input, in a backwards order, a plurality of input values at each time point in the time-series input data sequence, and a weight parameter $W_{ji}^{[\delta]}$ between each input value $x_j^{[t]}$ at time points after the time point corresponding to the plurality of input nodes i and each input node i. Here, the weight parameter between the input layer 14 at the one time point and a plurality of input layers 14 after the one time point is $W_{VV}$. Furthermore, the second model may include a weight parameter $W_{ji}^{[\delta]}$ between each of a plurality of hidden nodes j corresponding to time points after the time point corresponding to the plurality of input nodes i and each input node i. Here, the weight parameter between the input layer 14 at the one time point t and the plurality of hidden layers 16 after the one time point t is $W_{VH}$.

The second model may further include a weight parameter $W_{ji}^{[\delta]}$ between each input node j corresponding to a time point after the time point corresponding to the plurality of input nodes i and each hidden node i corresponding to a time point corresponding to the plurality of input nodes i. Here, the weight parameter between the hidden layer 16 at the one time point t and the plurality of input layers 14 after the one time point t is $W_{HV}$. The second model may further include a weight parameter $W_{ji}^{[\delta]}$ between each of the plurality of hidden nodes j corresponding to a time point after the time point corresponding to the plurality of input nodes i and each hidden node i corresponding to the time point corresponding to the plurality of input nodes i. Here, the weight parameter between the hidden layer 16 at the one time point t and the plurality of hidden layers 16 after the one time point t is $W_{HH}$.

With b representing a bias parameter of the second model, the conditional probability p of the input nodes i and the hidden nodes i at the one time point may be calculated based on the following expression.

$$p(x_j^{[t]}, h_j^{[t]} \mid x_i^{[t+1:]}, h_i^{[t+1:]}) \sim$$ Expression 20

$$\exp\left(b^T \begin{pmatrix} x_j^{[t]} \\ h_j^{[t]} \end{pmatrix} + \sum_{\delta > 0} (x_i^{[t]}, h_i^{[t]})^T W_{ji}^{[\delta]} \begin{pmatrix} x_j^{[t+\delta]} \\ h_j^{[t+\delta]} \end{pmatrix}\right) \sim$$

$$\exp\left(b^T \begin{pmatrix} x_j^{[t]} \\ h_j^{[t]} \end{pmatrix} + \sum_{\delta > 0} (x_i^{[t+\delta]}, h_i^{[t+\delta]})^T (W_{ij}^{[\delta]})^T \begin{pmatrix} x_j^{[t]} \\ h_j^{[t]} \end{pmatrix}\right)$$

As shown in Expression 19 and Expression 20, the learning apparatus 100 may be operable to learn each parameter in common for the first model and the second model. Furthermore, the learning operation of the learning apparatus 100 using the second model may be operable to be performed using the same operation as the learning operation using the first model. For example, the bias parameters for the first model and the second model may be substantially the same parameter. The weight parameters $W_{ij}$ and $W_{ji}$ for the first model and the second model may be operable to be converted according to a transpositional relationship there between. Furthermore, the learning parameters $u_{i,j,k}$ and $v_{i,j,l}$ of the first model may be operable to be converted to the learning parameters $u_{j,i,k}$ and $v_{j,i,l}$ of the second model by switching i and j.

The predefined parameters $\lambda_k^{t1}$ and $\mu_l^{t2}$ of the first model and the second model may be substantially the same parameter. Since the value of the predefined parameter is determined according to the time point difference, the predefined parameter value may change differently according to each time point in the first model and the second model.

In this way, by applying the conversion operation, the parameters of the first model and the second model are shared. Accordingly, the learning result of the first model and the learning result of the second model based on the same time-series input data sequence will theoretically match. However, there are cases where differences in the ease of learning occur, according to the directional order in which the data is input.

For example, the value of the input layer 14 at the one time point t and the plurality of values of the input layer 14 before the one time point t are already known as the time-series input data. Furthermore, the plurality of values of the hidden layer 16 before the one time point t are values obtained after a certain amount of time points have passed from when these values were sampled, for example, and therefore an evaluation result is already obtained for most of these values. Accordingly, the weight parameters $W_{VV}$ and $W_{HV}$ relating to the input layer 14 at the one time point t in the first model are parameters that can be accurately learned.

Furthermore, the value of the hidden layer 16 at the one time point t is a sampled value, for example, and therefore an evaluation result of this sampled value becomes known after several instances of learning have been completed. Accordingly, there are cases where the weight parameters $W_{VH}$ and $W_{HH}$ relating to the hidden layer 16 at the one time point t in the first model are difficult to learn. In the present embodiment, the weight parameter $W_{VH}$ that is difficult to learn in the first model is set as a first learning target parameter, and the weight parameter $W_{HV}$ that can be accurately learned is set as a second learning target parameter.

In the second model, in the same manner, the weight parameters $W_{VV}$ and $W_{VH}$ relating to the input layer 14 at the one time point t are parameters that can be accurately learned. On the other hand, there are cases where the weight parameters $W_{HV}$ and $W_{HH}$ relating to the hidden layer 16 at the one time point t are difficult to learn. Therefore, the weight parameter $W_{VH}$ that can be accurately learned in the second model is set as a first learning target parameter, and the weight parameter $W_{HV}$ that is difficult to learn is set as a second learning target parameter.

Here, the first learning target parameter $W_{VH}$ of the first model may be expressed relatively as the weight parameter between a past input layer 14 and a future hidden layer 16. The first learning target parameter $W_{VH}$ of the second model may also be expressed relatively as the weight parameter between a past input layer 14 and a future hidden layer 16. Accordingly, the first learning target parameter $W_{VH}$ of the first model and the first learning target parameter $W_{VH}$ of the second model may be a common parameter, or the first learning target parameter $W_{VH}$ of the first model may be operable to be converted into the first learning target parameter $W_{VH}$ of the second model. Accordingly, by learning the first learning target parameter $W_{VH}$ using the second model that can accurately learn this parameter, the learning apparatus 100 can easily calculate the first learning target parameter $W_{VH}$ that can be difficult to calculate with the first model.

Similarly, the second learning target parameter $W_{HV}$ of the first model may be expressed relatively as the weight parameter between a past hidden layer 16 and a future input layer 14. The second learning target parameter $W_{HV}$ of the second model may also be expressed relatively as the weight parameter between a past hidden layer 16 and a future input layer 14. Accordingly, the second learning target parameter $W_{HV}$ of the first model and the second learning target parameter $W_{HV}$ of the second model may be a common parameter, or the second learning target parameter $W_{HV}$ of the first model may be operable to be converted into the second learning target parameter $W_{HV}$ of the second model. Accordingly, by learning the second learning target parameter $W_{HV}$ using the first model that can accurately learn this parameter, the learning apparatus 100 can easily calculate the second learning target parameter $W_{HV}$ that can be difficult to calculate with the second model.

In this way, the learning apparatus 100 according to the present embodiment may be operable to perform efficient learning by using the first model and the second model to learn a parameter that is difficult for one of the models to learn using a parameter that can be accurately learned by the other model. The following describes the learning operation of such a learning apparatus 100.

Figure 11:
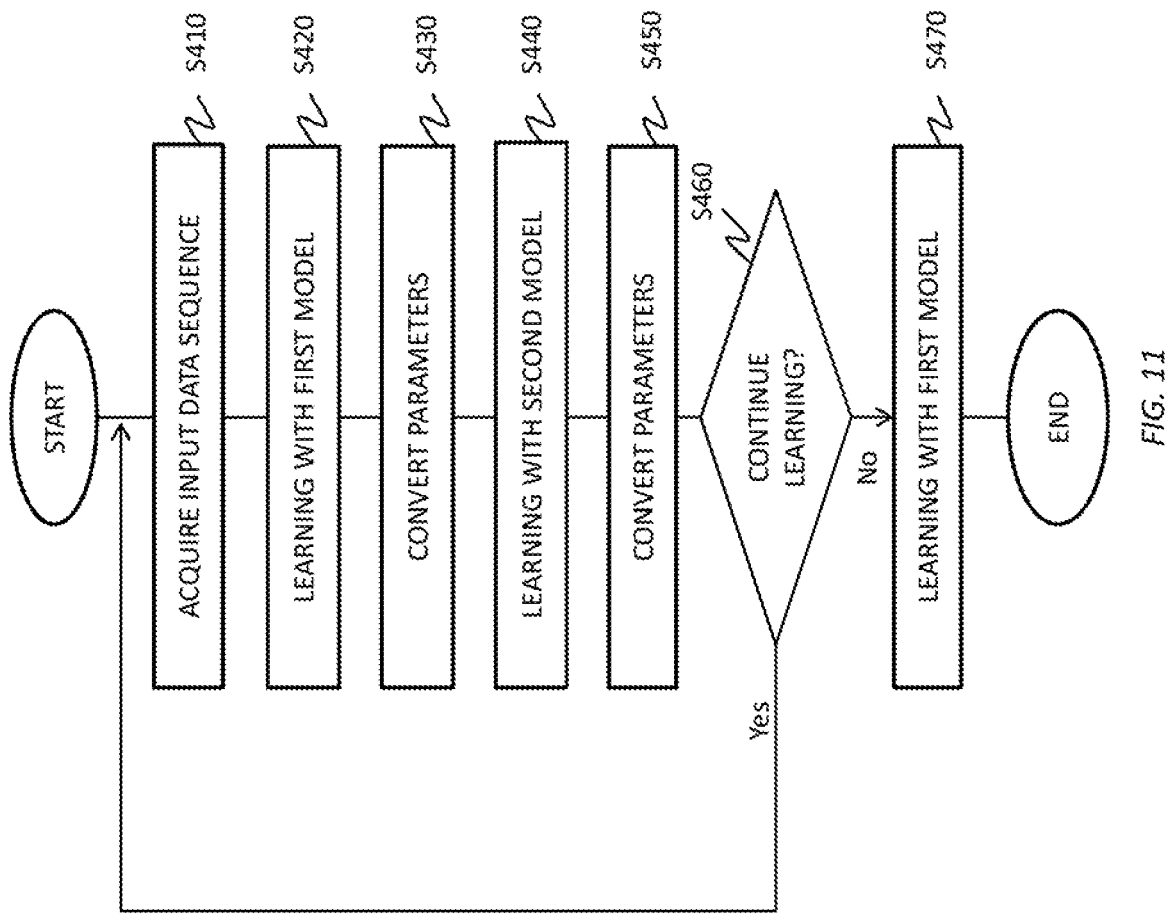
FIG. 11 shows an operational flow of the learning process using the first model and the second model performed by the learning apparatus 100, according to an embodiment of the present invention.

FIG. 11 shows an operational flow of the learning process using the first model and the second model performed by the learning apparatus 100 according to the present embodiment. In the present embodiment, the learning apparatus 100 may be operable to accurately learn a model 10 corresponding to time-series input data by performing the processes from S410 to S470.

First, the acquiring section 110 may acquire a time-series input data sequence (S410). In the present embodiment, an example is described in which the acquiring section 110 acquires, as the time-series input data sequence, time series data in an interval L that is longer than an interval T of the time-series data used for one instance of learning. The acquiring section 110 acquires L pieces of image data arranged in time series to form moving image data, for example.

Next, the learning apparatus 100 may learn the weight parameter between each input value and each hidden node corresponding to a time point before a time point corresponding to a plurality of input nodes in the first model, using a first model learning process (S420). Specifically, the supplying section 120 may sequentially input the time-series input data sequence into the model 10 in order from the older pieces of input data, and the storage section 130 may sample the values of the plurality of hidden nodes corresponding to the respective time points and store the values respectively in the corresponding plurality of hidden nodes.

The learning apparatus 100 may perform this learning using the first model. Specifically, the calculating section 140 may calculate the conditional probability of each input value of the input node at the one time point, and the learning processing section 150 may update the parameter θ. Furthermore, the updating section 170 may update the update parameter. The learning operation of the learning apparatus 100 has already been described above, and therefore is not provided here. The learning apparatus 100 may be operable to perform the learning process a predetermined number of times using the first model.

Next, the learning apparatus 100 may convert the parameter learned using the first model into a parameter corresponding to the second model (S430). In this case, the updating section 170 includes a converting section, and the converting section may be operable to convert the parameter of the first model into the parameter of the second model. The converting section may convert the parameters by performing a transposition, element replacement, and the like.

$$u_{j,i,k} \leftarrow u_{i,j,k} v_{j,i,l} \leftarrow v_{i,j,l}$$

$$W_{j,i} \leftarrow W_{i,j} \qquad \text{Expression 21:}$$

Next, the learning apparatus 100 may learn the weight parameter between each of the plurality of hidden nodes and each input node corresponding to the time points after the time point corresponding to the plurality of input nodes in the second model, by using the learning process with the second model using the converted parameter (S440). Specifically, the supplying section 120 may sequentially input the time-series input data sequence into the model 10 in order from the newer pieces of input data, and the storage section 130 may sample the values of the plurality of hidden nodes corresponding to each time point and store the sampled values respectively in the corresponding plurality of hidden nodes.

The supplying section 120 and the storage section 130 may store each piece of data in a FIFO memory 160 used for learning by the second model, which is different from a FIFO memory 160 used for learning by the first model. The learning apparatus 100 may be operable to perform the learning process a predetermined number of times using the second model.

Next, the learning apparatus 100 may convert the parameter learned using the second model into the parameter corresponding to the first model (S450). In this case, the converting section may be operable to convert the parameter of the second model into the parameter of the first model. The converting section may convert the parameters using a transposition, element replacement, and the like.

$$u_{i,j,k} \leftarrow u_{j,i,k} v_{i,j,l} \leftarrow v_{j,i,l}$$

$$W_{i,j} \leftarrow W_{j,i} \qquad \text{Expression 22:}$$

The learning apparatus 100 may judge whether the learning is to continue (S460). The learning apparatus 100 may continue the learning until the learning process has been performed a predetermined number of times, or may instead continue the learning until a stop command from the user is input. As another example, the learning apparatus 100 may continue the learning until there is no more data in the time-series input data sequence that can be input.

If the learning is to continue (S460: Yes), the learning apparatus 100 returns to step S410, and if there is no more time-series data to be supplied to the model 10, the acquiring section 110 may acquire the next piece of data in the time-series data sequence. The learning apparatus 100 may sequentially perform learning with the first model and the second model based on the next piece of time-series data.

If the learning is ended (S460: No), the learning processing section 150 may perform a final learning process using the first model (S470). The learning processing section 150 may be operable to acquire the learned first model after performing the learning process with the first model one or more times. The learning processing section 150 may be operable to output the learned first model to the database 1000 or the like. The learning processing section 150 may output the first model and end the learning process.

In this way, the learning apparatus 100 may output, as the learned model, the model used to perform the last instance of learning corresponding to the model to be output from among the first model and the second model. Specifically, FIG. 11 describes an example in which the learned first model is output, but if the learned second model is output, the learned second model may be output without performing the process of S450 for converting the parameters.

The learning apparatus 100 may continue with the learning while focusing more heavily on learning corresponding to the model to be output from among the first model and the second model. For example, the learning apparatus 100 may perform the learning process with the first model a greater number of times than the learning process with the second model. Furthermore, the learning apparatus 100 may be operable to perform the learning using a higher learning rate for the learning process with the first model than for the learning process with the second model, by adjusting a coefficient or the like. In this way, the learning apparatus 100 performs learning in a focused manner corresponding to the model to be output, and can therefore output a more suitable learned parameter model using this model.

As described above, the learning process of the learning apparatus 100 according to the present embodiment performs a bidirectional learning process with the first model and the second model, using common parameters. Accordingly, even if parameters having learning accuracies that fluctuate according to the learning direction are included, the learning apparatus 100 can learn these parameters with higher accuracy. Furthermore, by performing bidirectional learning, the learning apparatus 100 can prevent the occurrence of overfitting caused when model learning is performed using only one of the first model and the second model.

The learning process of the learning apparatus 100 according to the present embodiment described above is an example of a bidirectional learning process performed using a forward model and a backward model. In addition to this, the learning apparatus 100 may make a distinction in the parameters being learned according to the model.

As described in FIG. 9 and FIG. 10, the first learning target parameter $W_{VH}$ of the first model may be operable to be learned with higher accuracy for learning using the second model than for learning using the first model. Furthermore, the second learning target parameter $W_{HV}$ of the first model may be operable to be learned with higher accuracy for learning using the first model than for learning using the second model.

In this case, the learning using the first model performed by the learning apparatus 100 may be operable to learn the second learning target parameter $W_{HV}$ without changing the first learning target parameter $W_{VH}$. In other words, when learning with the first model, the learning apparatus 100 may update the second learning target parameter $W_{HV}$ without updating the first learning target parameter $W_{VH}$. Furthermore, the learning using the second model performed by the learning apparatus 100 may be operable to learn the first learning target parameter $W_{VH}$ without changing the second learning target parameter $W_{HV}$. In other words, when learning with the second model, the learning apparatus 100 may update the first learning target parameter $W_{VH}$ but need does not need to update the second learning target parameter $W_{HV}$.

Instead of this, the learning apparatus 100 may increase or decrease the update amount, according to the model used for the learning. For example, when learning with the first model, the learning apparatus 100 may perform the update by multiplying the update amount of the first learning target parameter $W_{VH}$ by a coefficient ρ, and multiplying the update amount of the second learning target parameter $W_{HV}$ by (1−ρ). Here, the coefficient ρ may be a positive value that is less than 0.5. In the same manner, when learning with the second model, the learning apparatus 100 may perform the update by multiplying the update amount of the first learning target parameter $W_{VH}$ by (1−ρ), and multiplying the update amount of the second learning target parameter $W_{HV}$ by the coefficient ρ.

In this way, the learning apparatus 100 can perform the learning process more accurately by encouraging parameter updates that are suitable for the learning, according to the model used for the learning. Accordingly, by including the hidden nodes, the learning apparatus 100 can improve the expressive power, learning power, and the like, and can perform the learning more accurately by performing the bidirectional learning process.

The learning apparatus 100 according to the present embodiment described above is an example in which the learning apparatus 100 acquires and learns a time-series input data sequence, but the present invention is not limited to time-series data. For example, for a two-dimensional image that has n pixels vertically and m pixels horizontally, n-pixel column data arranged in a column direction may be used as the data corresponding to the input data at the one time point. In this case, the plurality of pieces of column data arranged in the row direction may be the data corresponding to the input data before or after the one time point. In this case, the learning apparatus 100 may perform the bidirectional learning for a case where a plurality of pieces of column data are input to the model 10 in one row direction and a case where the plurality of pieces of column data are input to the model 10 in the other row direction. The learning apparatus 100 may perform the bidirectional learning for waveform data, image pattern data, language data, and the like, in the same manner.

The learning apparatus 100 according to the present embodiment described above is an example in which the learning apparatus 100 acquires one input data sequence and generates training data for the bidirectional learning, based on this one input data sequence, but the data acquired in the present invention is not limited to one input data sequence. The learning apparatus 100 may acquire a plurality of data sequences. In this case, the learning apparatus 100 may use learning with the first model for the first input data sequence and use learning with the second model for a second input data sequence that differs from the first input data sequence.

In this case, the first input data sequence and the second input data sequence are preferably at least partially related. Furthermore, if the data sequences are the same type or have substantially the same trend, the first input data sequence and the second input data sequence may be input data sequences for learning that are different from each other and are included in a plurality of input data sequences for learning.

In this case, the learning apparatus 100 may be operable to, based on the first model, sequentially input each piece of input data from the first input data sequence, in which are arranged pieces of input data including a plurality of input values, into the input nodes of the model 10, to perform the learning process using the first model. The learning apparatus 100 may be operable to input each piece of input data from the second input data sequence, in which are arranged pieces of input data including a plurality of input values, into the input nodes of the model 10 in a different order than in the first model, to generate the second model for learning the first learning target parameter included in the first model.

The learning apparatus 100 may be operable to input each piece of input data from the second input data sequence in a backwards order, to generate the second model for learning the learning target parameter. The first and second input data sequences may be time-series input data sequences. In this case, the first model may input the first input data sequence in order from the older pieces of input data, and the second model may input the second input data sequence in order from the newer pieces of input data.

The learning apparatus 100 may be operable to perform the learning process using both the first model and the second model. The learning apparatus 100 may be operable to output the learned first model after performing the bidirectional learning with the first model and the second model. The learning apparatus 100 may be operable to delete the learned second model and output the learned first model as the predictive model based on the input data sequence. In this way, the learning apparatus 100 may be operable to acquire a plurality of input data sequences for learning and perform the learning process.

The learning apparatus 100 according to the present embodiment described above is an example in which the learning apparatus 100 learns by applying substantially the same learning process to the first learning target parameter and the second learning target parameter. Instead of this, the learning apparatus 100 may learn by applying different learning processes respectively to the first learning target parameter and the second learning target parameter. In other words, the learning apparatus 100 may be operable to perform an update by decreasing the update amount for a parameter that can be difficult to learn.

In this case, when learning with the first model and the second model, the learning apparatus 100 may perform the updates using $\theta_V = (b_{Vj}, W_{HV}, W_{VV})$ and $\theta_H = (b_{Hj}, W_{VH}, W_{HH})$ as the respective update parameters. In other words, the learning apparatus 100 may be operable to independently perform learning with $\theta_V$ as an update parameter than can be accurately updated and with $\theta_H$ as an update parameter than can be difficult to learn. Here, $b_{Vj}$ indicates the bias parameter corresponding to each node of the input layer 14. Furthermore, $b_{Hj}$ indicates the bias parameter corresponding to each node of the hidden layer 16.

As an example, a lower bound for the total likelihood can be expressed as shown in the following expression from Jensen's inequality. Here, the value $\tilde{h}$ of the hidden node may be sampled in correspondence with $p_\theta(\tilde{h}|x)$.

$$\log p_\theta(x) = \log \prod_t \left( \sum_{\tilde{h}} p_\theta(x^{[t]} | x^{[:t-1]}, \tilde{h}^{[:t-1]}) \right.$$
$$\left. \prod_{s<t} p_\theta(\tilde{h}^{[s]} | x^{[:s-1]}, \tilde{h}^{[:s-1]}) \right) \geq$$
$$\sum_{\tilde{h}} p_\theta(\tilde{h}|x) \sum_t \log p_\theta(x^{[t]} | x^{[:t-1]}, \tilde{h}^{[:t-1]})$$

Expression 23

From Expression 23, the stochastic gradient may be calculated as shown in the following Expression, according to the parameter to be updated.

$$\nabla_{\theta_V} \log p_\theta(x) = \nabla_{\theta_V} \log p_\theta(x^{[t]} | x^{[:t-1]}, \tilde{h}^{[:t-1]})$$
$$\nabla_{\theta_H} \log p_\theta(x) \approx \log p_\theta(x^{[t]} | x^{[:t-1]}, \tilde{h}^{[:t-1]})$$
$$\left( \sum_{s \leq t} \nabla_{\theta_H} \log p_\theta(\tilde{h}^{[s]} | x^{[:s-1]}, \tilde{h}^{[:s-1]}) \right)$$

Expression 24

The learning apparatus 100 may be operable to, when learning using the first model, update the parameter $\theta_V$ that can be learned accurately as described above. In this case, the update of the parameter $\theta_V$ can be expressed as shown in the expression below.

$$\theta_V \leftarrow \theta_V + \eta \nabla_{\theta_V} \log p_\theta(x^{[t]}|x^{[:t-1]}, \tilde{h}^{[:t-1]})$$

Expression 25:

Furthermore, the learning apparatus 100 may be operable to, when learning using the first model, gradually update the parameter $\theta_H$ that can be difficult to learn, by using a gentle gradient. In this case, the update of the parameter $\theta_H$ can be expressed as shown in the expression below. The parameter g is a gradient parameter indicating the direction of the gradient. The constant ε may be a value less than 1, and may be a value closer to 0, for example. The log $p_\theta$ operating on $\eta g$ in the expression for updating $\theta_H$ need not be included. Furthermore, in the same manner as $\eta_1$, $\eta$ may be a constant for adjusting the update amount or may be a coefficient whose value becomes smaller according to an increase in the number of updates.

$$g \leftarrow \varepsilon g + (1-\varepsilon) \nabla_{\theta_H} \log p_\theta(\tilde{h}^{[t]}|x^{[:t-1]}, \tilde{h}^{[:t-1]})$$
$$\theta_H \leftarrow \theta_H + \log p_\theta(x^{[t]}|x^{[:t-1]}, \tilde{h}^{[:t-1]})$$

Expression 26:

In the same manner, the learning apparatus 100 may be operable to, when learning using the second model, update the parameter $\theta_V$ that can be accurately learned, as shown in the following expression.

$$\theta_V \leftarrow \theta_V + \eta_i \nabla_{\theta_V} \log p_\theta(x^{[t]}|x^{[:t+1]}, \tilde{h}^{[:t+1]})$$

Expression 27:

The learning apparatus 100 may be operable to, when learning using the second model, update the parameter $\theta_H$ that can be difficult to learn, as shown in the following expression. The log $p_\theta$ operating on $\eta g$ in the expression for updating $\theta_H$ need not be included.

$$g \leftarrow \varepsilon g + (1-\varepsilon) \nabla_{\theta_H} \log p_\theta(\tilde{h}^{[t]}|x^{[:t+1]}, \tilde{h}^{[:t+1]})$$
$$\theta_H \leftarrow \theta_H + \log p_\theta(x^{[t]}|x^{[:t+1]}, \tilde{h}^{[:t+1]}) \eta g$$

Expression 28:

As described above, the learning apparatus 100 can perform the learning process more accurately by changing the method used according to the ease of learning the parameter.

The bidirectional learning process of the learning apparatus 100 according to the present embodiment described above is an example suitable for a Boltzmann machine, but the present invention is not limited to this. The present invention can be applied to any learning apparatus that is operable to bidirectionally learn a data series and capable of changing the ease of the learning according to the learning direction.

Figure 12:
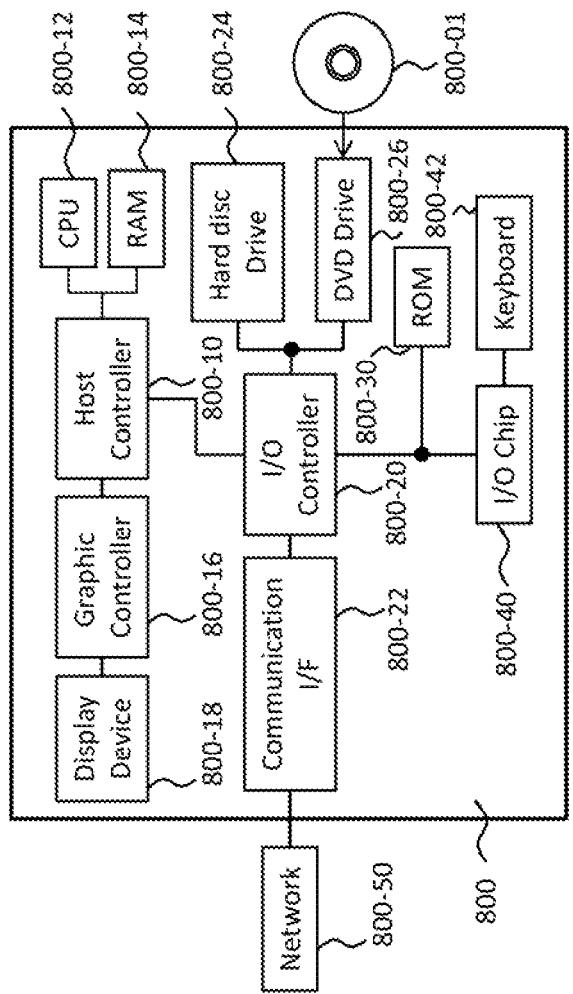
FIG. 12 shows an exemplary hardware configuration of a computer, according to an embodiment of the present invention.

FIG. 12 shows an example of a computer 800 in which aspects of the present invention may be wholly or partly embodied. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800-

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/ replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

A model in accordance with the present invention can be used for a myriad of applications including, but not limited to, classification, recognition (e.g., speech recognition, speaker recognition, pattern recognition, etc.), robotics (e.g., robotic control, robotic decision making), machine control (e.g., controlling a movement of a machine (e.g., an assembly line machine), or powering down the machine, or changing the operational state of the machine (e.g., faster, slower, on, off, full-power, low-power, etc.) based on an output of the model, and so forth. Thus, such a model can be used within systems including, but not limited to, classification systems (e.g., speech recognition systems, speaker recognition systems, pattern recognition systems, etc.), machine control systems (or machine controllers), etc. These and other applications to which the present invention can be applied are readily determined by one of ordinary skill in the art, given the teachings of the present invention provided herein, while maintaining the spirit of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to perform learning while preventing overfitting and a decrease in learning accuracy in a predictive model based on a data sequence, and to improve the expressive power and learning power of a learning apparatus.

What is claimed is:

1. A computer program product for predictive model learning, the computer program product comprising a non-transitory computer readable storage medium having program instructions embodied therewith, the program instructions executable by a computer to cause the computer to perform a method comprising:

generating, by a processor, a second model based on a first model, the first model performing a learning process, utilizing a Boltzmann machine neural network, based on sequentially inputting, starting at an arbitrary point in a first input data sequence, each of a plurality of pieces of input data that include a plurality of input values and are from a first input data sequence into a FIFO memory, the second model, a backward model including a weight parameter between each of a plurality of hidden nodes, learning a first learning target parameter included in the first model based on sequentially inputting, in a backward order differing from an order in the first model into another FIFO memory, each of a plurality of pieces of input data that include a plurality of input values from a second input data sequence input into the second model in an order from future data to past;

performing, by the processor, a learning process using both the first model and the second model including updating learning parameters of a hidden node at a particular time point according to conditional probabilities computed at time points before the particular time point by focusing the learning process on a parameter determined to be more accurately learned using the second model than the first model and adjusting learning rates based on the second model by applying higher learning rates to the second model for output;

selecting a weight parameter that is determined to have a lower learning accuracy at the particular time point in the first model than in the second model as the first learning target parameter, wherein the learning processes in the second model learns a second learning target parameter without changing the first learning target parameter and when learning with the first model, the learning process may update the second learning target parameter without updating the first learning target parameter; and storing, in a memory device, the first model that has been learned and deleting the second model from the memory device upon a determination that one or more threshold conditions are met.

2. The computer program product of claim 1, wherein the first input data sequence and the second input data sequence are time-series input data sequences, the first model inputs the first input data sequence in order starting at the arbitrary point from older to newer ones of the plurality of pieces of input data, and the second model inputs the second input data sequence in order from newer to older ones of the plurality of pieces of input data.

3. The computer program product of claim 2, wherein the first model includes a plurality of input nodes that sequentially input a plurality of input values at each time point of the first input data sequence, and a weight parameter between each input node and each input value at a time point before a time point corresponding to the plurality of input nodes, and the second model includes a plurality of input nodes that input, in a backwards order, a plurality of input values at each time point of the second input data sequence, and a weight parameter between each input node and each input value at a time point after the time point corresponding to the plurality of input nodes.

4. A learning apparatus for learning a model corresponding to input data, comprising:

a processor; and one or more computer readable mediums collectively including instructions that, when executed by the processor, cause the processor to:

generate a second model based on a first model, the first model performing a learning process, utilizing a Boltzmann machine neural network, based on sequentially inputting, starting at an arbitrary point in a first input data sequence, each of a plurality of pieces of input data that include a plurality of input values and are from a first input data sequence into a FIFO memory, the second model, a backward model including a weight parameter between each of a plurality of hidden nodes, learning a first learning target parameter included in the first model based on sequentially inputting, in a backward order differing from an order in the first model into another FIFO memory, each of a plurality of pieces of input data that include a plurality of input values from a second input data sequence input into the second model in an order from future data to past;

perform a learning process using both the first model and a second model including updating learning parameters of a hidden node at a particular time point according to conditional probabilities computed at time points before the particular time point by focusing the learning process on a parameter determined to be more accurately learned using the second model than the first model and adjusting learning rates based on the second model, with higher learning rates being applied to the second model for output;

select a weight parameter that is determined to have a lower learning accuracy at the particular time point in the first model than in the second model as the first learning target parameter, wherein the learning processes in the second model learns a second learning target parameter without changing the first learning target parameter and when learning with the first model, the learning process may update the second learning target parameter without updating the first learning target parameter; and store the first model that has been learned and deleting the second model from a memory device upon a determination that one or more threshold conditions are met.

5. The learning apparatus of claim 4, wherein the first input data sequence and the second input data sequence are time-series input data sequences, the first model inputs the first input data sequence in order starting at the arbitrary point from older to new ones of the plurality of pieces of input data, and the second model inputs the second input data sequence in order from newer to older ones of the plurality of pieces of input data.

6. The learning apparatus of claim 5, wherein the first model includes a plurality of input nodes that sequentially input a plurality of input values at each time point of the first input data sequence, and a weight parameter between each input node and each input value at a time point before a time point corresponding to the plurality of input nodes, and the second model includes a plurality of input nodes that input, in a backwards order, a plurality of input values at each time point of the second input data sequence, and a weight parameter between each input node and each input value at a time point after the time point corresponding to the plurality of input nodes.

7. The computer program product of claim 1, wherein a weight parameter that is more accurately learned at a given time in the second model than the first model is set as the second learning target parameter of the second model.

8. The computer program product of claim 7, wherein the first learning target parameter is learned using the second model that more accurately learns the first learning target parameter than the first model.

9. The computer program product of claim 8, wherein the first learning target parameter is expressed relatively as a weight parameter between a past input layer and a future hidden layer, and wherein the second learning target parameter is expressed relatively as a weight parameter between a past hidden layer and a future input layer.

10. The computer program product of claim 1, wherein each of the FIFO memories may sequentially store input data and outputs the stored data after a predetermined number of storages have been performed.

11. The computer program product of claim 1, wherein each of the FIFO memories sequentially stores an input value of a common neural network layer and outputs the input value after a predetermined number of storages have been performed.

12. The computer program product of claim 1, further comprising a first plurality of FIFO memories, including the FIFO memory, and a second plurality of FIFO memories, including another FIFO memory, respectively corresponding to the first model and the second model, wherein the first plurality of FIFO memories has a number of member FIFO memories which is greater than a number of nodes of the first model, and wherein the second plurality of FIFO memories has a number of member FIFO memories which is greater than a number of nodes of the second model.

13. The computer program product of claim 12, wherein each of the pluralities of FIFO memories is configured to update a history for a respective node of a common layer.

14. The computer program product of claim 1, wherein a weight parameter is determined based on a positive value that is based on a product of the first learning target parameter and a first predefined parameter and a negative value that is based on a product of a second learning target parameter and a second predefined parameter.

15. The computer program product of claim 14, wherein the weight parameter is a positive value based on a time point difference being greater than a predetermined delay constant, wherein the weight parameter is a negative value based on the time point difference being less than the predetermined delay constant and non-zero, wherein the weight parameter is zero when the time point difference is zero, and wherein the time point difference is between hidden nodes and the input data at two different time points.

16. The computer program product of claim 15, wherein the predefined parameters change in a predetermined manner in accordance with the time point difference.

17. The computer program product of claim 1, further comprising:
learning a second learning target parameter using the first model having a higher learning accuracy than the second model at a given time, after learning the first model.

18. The computer program product of claim 17, further comprising iteratively repeating the learning of the first model and the learning of the second model.

19. A computer-implemented method, comprising:
generating, by a processor, a second model based on a first model, the first model performing a learning process, utilizing a Boltzmann machine neural network, based on sequentially inputting, starting at an arbitrary point in a first input data sequence, each of a plurality of pieces of input data that include a plurality of input values and are from a first input data sequence into a FIFO memory, the second model, a backward model including a weight parameter between each of a plurality of hidden nodes, learning a first learning target parameter included in the first model based on sequentially inputting, in a backward order differing from an order in the first model into another FIFO memory, each of a plurality of pieces of input data that include a plurality of input values from a second input data sequence input into the second model in an order from future data to past;
performing, by the processor, a learning process using both the first model and the second model including updating learning parameters of a hidden node at a particular time point according to conditional probabilities computed at time points before the particular time point by focusing the learning process on a parameter determined to be more accurately learned using the second model than the first model and adjusting learning rates based on the second model by applying higher learning rates to the second model for output;
selecting a weight parameter that is determined to have a lower learning accuracy at the particular time point in the first model than in the second model as the first learning target parameter, wherein the learning processes in the second model learns a second learning target parameter without changing the first learning target parameter and when learning with the first model, the learning process may update the second learning target parameter without updating the first learning target parameter; and
storing, in a memory device, the first model that has been learned and deleting the second model from the memory device upon a determination that one or more threshold conditions are met.

20. The computer-implemented method of claim 19, wherein
the first input data sequence and the second input data sequence are time-series input data sequences,
the first model inputs the first input data sequence in order starting at the arbitrary point from older to newer ones of the plurality of pieces of input data, and
the second model inputs the second input data sequence in order from newer to older ones of the plurality of pieces of input data.

* * * * *